United States Patent [19]
Itoh et al.

[11] Patent Number: 5,773,711
[45] Date of Patent: Jun. 30, 1998

[54] CAN INTERNAL PRESSURE INSPECTION APPARATUS

[75] Inventors: Hideo Itoh; Mithuo Yokoyama; Saburo Itoh; Fumihiko Usui, all of Sunto-gun, Japan

[73] Assignee: Mitsubishi Materials Corporation, Tokyo, Japan

[21] Appl. No.: 781,037

[22] Filed: Jan. 9, 1997

[30] Foreign Application Priority Data

| Jan. 9, 1996 | [JP] | Japan | ..................................... 8-001835 |
| Jan. 9, 1996 | [JP] | Japan | ..................................... 8-001836 |
| Jan. 9, 1996 | [JP] | Japan | ..................................... 8-001840 |

[51] Int. Cl.$^6$ ............................. G01M 3/36; G01M 3/26; G01B 5/16
[52] U.S. Cl. ..................................... 73/52; 73/45; 73/49.3
[58] Field of Search .................................. 73/52, 49.3, 45

[56] References Cited

U.S. PATENT DOCUMENTS

| 2,309,231 | 1/1943 | Bagley ........................................ 73/51 |
| 3,178,932 | 4/1965 | Stuchbery et al. ........................ 73/45.2 |
| 4,706,494 | 11/1987 | Creed et al. .............................. 73/49.3 |
| 4,898,023 | 2/1990 | Yamada et al. ............................. 73/52 |
| 4,955,226 | 9/1990 | Beaty et al. ............................. 73/49.3 |
| 5,156,329 | 10/1992 | Farrell ................................ 229/125.35 |
| 5,287,729 | 2/1994 | Lehmann ................................. 73/49.3 |
| 5,367,900 | 11/1994 | Frederickson et al. ..................... 73/52 |
| 5,507,177 | 4/1996 | Focke ....................................... 73/49.3 |
| 5,528,925 | 6/1996 | Sherepa et al. ............................. 73/41 |
| 5,542,288 | 8/1996 | Fenlon .................................... 73/49.3 |

*Primary Examiner*—Hezron E. Williams
*Assistant Examiner*—J. David Wiggins
*Attorney, Agent, or Firm*—Armstrong, Westerman, Hattori, McLeleand & Naughton

[57] ABSTRACT

An internal pressure inspection is simply conducted for cans of types different in dimension and for assuredly removing defective cans. The inspection apparatus comprises first and second can barrel pressure detectors and a can cover pressure detector for detecting the internal pressure of a can, and a can sensor for sensing a can, which underwent the detection of the internal pressure, to output a can sense signal. In the inspection apparatus, a control unit decides the acceptance or failure in the can internal pressure and, when the failure decision is made, starts a defective can removal unit on the basis of the can sense signal from the can sensor. An apparatus body has a separation change mechanism including a width variable gauge which is placed between first and second movable frames and which can change its own width in accordance with its own rotation. The first and second movable frames and which can change its own width in accordance with its own rotation. The first and second movable frames support a can barrel guide section and a can barrel pressure detection section so that they can freely approach and separate from each other in accordance with the amount of rotation applied to such width variable gauge.

6 Claims, 19 Drawing Sheets

CAN INTERNAL PRESSURE INSPECTION APPARATUS

BACKGROUND OF THE INVENTION

1. Field of the Invention

The present invention relates to a can internal (in-can) pressure inspection apparatus for inspection of the internal pressure of manufactured cans, and more particularly to a can internal pressure inspection apparatus effective to the internal inspection of two-piece cans.

2. Description of the Prior Art

As a prior inspection apparatus effective to the internal pressure inspection for two-piece cans, an apparatus disclosed in Japanese Unexamined Patent Publication No. 1-187428 has been known. Referring to FIGS. 20 and 21, a description will be taken hereinbelow of this prior inspection apparatus. As shown in FIG. 21 a two-piece can 1 is composed of a cylindrical can barrel 2 having a bottom and a can cover 3 for closing the open end of the can barrel 2. This inspection apparatus comprises a belt conveyer (i.e., can carrying conveyer) 10 for conveying a bottom section 2b of the can barrel 2 in a can carrying direction (arrow X direction) in FIG. 20 in a state that the bottom section 2b is grounded. The inspection apparatus further comprises an apparatus body 20 equipped with a can barrel pressure detection section 21 and a can barrel guide section 25 which are placed in opposed relation to each other in a state that a can carrying path R1 is interposed therebetween. The apparatus body 20 is further provided with a can cover pressure detector 29, such as an eddy current type displacement sensor, which serves as a can pressure detector for detecting a bulge of the can cover 3 carried through the belt conveyer 10 to detect the can internal pressure, as shown in FIG. 21.

The can barrel pressure detection section 21 includes a guide wall 22 for guiding a drum section 2a of the can barrel 2. Additionally, can barrel pressure detection section 21 includes first and second barrel pressure detectors 23, 24, each acting as a can pressure detector, pressed against the drum section 2a of the can barrel 2 as shown in FIG. 21 for detecting the can internal pressure.

The can barrel guide section 25 is made up of an endless belt 27 wound around a pair of pullies 26. The pair of pullies 26 are disposed to be separated from each other in the can carrying direction (as shown in FIG. 20) and are rotationally driven so that the can side of the endless belt 27 is moved along the can carrying direction (counterclockwise in FIG. 20). The can barrel guide section 25 also includes a guide member 28 for guiding the endless belt 27 so that the endless belt 27 is pressed against the drum section 2a of the can barrel 2.

In this inspection apparatus, the can 1 is conveyed through the belt conveyer 10 in the X direction (indicated by an arrow in FIG. 20) to be sent between the can barrel pressure detection section 21 and the can barrel guide section 25. When being sandwiched therebetween, the can 1 is rolled and carried by the rotating operation of the endless belt 27 of the can barrel guide section 25. Further, when it passes through the first and second can barrel pressure detectors 23, 24 of the can barrel pressure detection section 21, the first and second can barrel pressure detectors 23, 24 press the drum section 2a of the can 1 to detect the internal pressure of the can. Still further, when it passes through the can cover pressure detector 29 in FIG. 21, the can cover pressure detector 29 senses the degrees of the bulge of the can cover 3 of the can 1 to additionally detect the can internal pressure.

In this way, for a single can 1, the can internal pressure is inspected and studied at a plurality of portions to enable the inspection of the can internal pressure with high accuracy. Incidentally, the detection data on the degree of the bulge of the can cover 3 is directly useful for the inspection for the failure of the can cover.

Moreover, in a can internal pressure inspection apparatus disclosed in Japanese Unexamined Patent Publication No. 60-122344, in the downstream side of the apparatus body there is provided a defective can removal unit which removes the can from a can carrying path when the can cover pressure detector detects the failure of the can internal pressure. This defective can removal unit is controlled by a control unit. Further, the can internal pressure inspection apparatus is provided with a can sensor for sensing the fact that a can passes through a fixed position on the can carrying path in the upstream side of the can pressure detector. The control unit decides the acceptance or failure of the can internal pressure sensed by the can pressure detector. When the decision shows a failure, on the basis of the failure decision and a can sense signal from the can sensor, the defective can removal unit starts to remove the defective can.

There is a problem which arises with the latter can internal pressure inspection apparatus, however, in that a long waiting time results because the can needs to pass through the can cover pressure detector until the can reaches the defective can removal unit after the can sensor senses the can. For this reason, in case that an error occurs in the can carrying speed, difficulty is experienced to precisely remove the defective can. In addition, in cases where the former can internal pressure inspection apparatus employs the can sensor, the control unit and the defective can removal unit, after the can sensor senses the can, the can needs to pass through first and second can barrel pressure detectors which press the drum section of the can to detect the can internal pressure. However, because the can carrying speed tends to vary, it is difficult to appropriately remove the defective can, with the result that a worker is required to manually remove the defective can. Hence, the above-described can internal pressure inspection operation is troublesome.

Furthermore, the cans 1 such as juice cans and beer cans are manufactured to have various sizes different in width and height. In the above-described prior can internal pressure inspection apparatus, the separation or gap between the can barrel pressure detection section 21 and the can barrel guide section 25 and the separation between the belt conveyer 10 and the can cover pressure detector 29 are fixed, and hence one can internal pressure inspection apparatus is necessary for each of various cans 1 different in size. That is, a disadvantage arises in that the can internal pressure inspection apparatus for one kind of can is unusable for different kinds of cans. For example, in the case of altering a manufacturing line for one kind of can to process a different type of can, since the old can internal pressure inspection apparatus is unusable for the new, different type of can to be inspected in the manufacturing line, there is a need to build a new can internal pressure inspection apparatus for the altered manufacturing line. This lengthens the down time of the manufacturing line and raises the cost for the system.

Still further, as described above, in the prior can internal pressure inspection apparatus, first and second pressing members 23a, 24a of the first and second can barrel pressure detectors 23, 24 are biased by cylinders 23b, 24b, respectively. In the air cylinders 23b, 24b, for ensuring the airtightness, rods 23d, 24d thereof are placed into contact with slidable bearings. However, if the internal pressure inspection is made of a large number of cans 1 for a long period of time, the bearings tend to seize, shortening their lifetime. For the elimination of this problem, the frequent replacement of the air cylinders 23b, 24b becomes necessary, further making this inspection complicated and troublesome.

SUMMARY OF THE INVENTION

It is therefore an object of the present invention to provide a can internal pressure inspection apparatus which is capable of precisely detecting defective cans and of simplifying the internal pressure inspection.

Another object of this invention is to provide a can internal pressure inspection apparatus which is capable of simply performing the internal pressure inspection of various kinds of cans different in size.

A further object of this invention is to provide a can internal pressure inspection apparatus which is capable of simply conducting the internal pressure inspection of cans.

In accordance with an aspect of the present invention, in a can internal pressure inspection apparatus equipped with a can pressure detector for detecting the internal pressure of a can conveyed on a can carrying path and a defective can removal unit for taking out the can from the can carrying path when the can pressure detector detects the failure in the internal pressure of the can, a can sensor is included for sensing the presence of a can for which the detection of the can internal pressure by the can pressure detector has been finished, and for outputting a can sense signal indicative of the presence of the can. Additionally, a control unit may be provided for deciding whether the can internal pressure detected by the can pressure detector is acceptable or not and for, when the decision is made that the can internal pressure is unacceptable, starting the defective can removal unit on the basis of its decision to the unacceptability and the can sense signal from the can sensor. Accordingly, for the removal of the defective cans, the defective can removal unit can be started at an appropriate time on the basis of the can sense signal from the can sensor, after the completion of the detection of the can internal pressure by the can pressure detector.

In addition, in the can internal pressure inspection apparatus, the can pressure detector serves as a can barrel pressure detector for detecting the can internal pressure by pressing the barrel portion of the can. Even if an error occurs in can carrying speed when detecting the can internal pressure, since the can sensor senses the presence of the can after the completion of the detection of the can internal pressure by the can pressure detector, the error in carrying speed does not influence the start time of the defective can removal unit.

Furthermore, in accordance with another aspect of this invention, a can internal pressure inspection apparatus is equipped with an apparatus body located in relation to a can carrying path, and the apparatus body includes a can barrel pressure detection section and a can barrel guide section which are disposed to be in opposed relation to each other in a state such that the can carrying path is interposed therebetween, and the can barrel pressure detection section has a can barrel pressure detector pressed against the barrel portion, with the inspection apparatus being further provided with a separation change mechanism for changing the separation between the can barrel pressure detection section and the can barrel guide section. Thus, even if the internal pressure inspection object is changed to another kind of can different in barrel width dimension from the current kind of can or even if the separation between the can barrel pressure detection section and the can barrel guide section assumes a distance unsuitable for the inspection, the separation change mechanism can change the separation between the can barrel pressure detection section and the can barrel guide section to match the can dimension.

In addition, the apparatus body is provided with a body frame, and the separation change mechanism is composed of a first movable frame for supporting the can barrel guide section, a second movable frame for supporting the can barrel pressure detection section and a width variable gauge rotatably attached to the body frame and disposed between the first and second movable frames to be brought into contact therewith, with the width variable gauge changing its own width in accordance with its rotation, and the first and second movable frames being movably supported by the body frame so that the can barrel pressure detection section and the can barrel guide section can approach each other and separate from each other. Whereupon, in cases where the internal pressure inspection object is changed to a can different in barrel width dimension and therefore the separation between the can barrel pressure detection section and the can barrel guide section becomes unsuitable for the inspection, the width variable gauge is rotated to change its width dimension so that the separation between the can barrel pressure detection section and the can barrel guide section becomes suitable to match the new can.

Still further, the can internal pressure inspection apparatus is provided with a positioning unit for moving and positioning the apparatus body in the axial direction of the can with the can carrying, path. Accordingly, in cases where the internal pressure inspection object is changed to a can different in barrel height dimension and therefore the pressing height of the can barrel pressure detector with respect to the barrel portion of the can becomes unsuitable for the inspection, the positioning unit moves and adjusts the apparatus body in the axial direction of the can with respect to the can carrying path to change the pressing height of the can barrel pressure detector relative to the barrel portion of the can.

Moreover, the apparatus body includes a can cover pressure detector disposed to be in opposed relation to a cover of the can undergoing conveyance on the can carrying path to detect the internal pressure of the can by sensing the bulge of the can cover. Accordingly, in addition to the can internal pressure inspection based upon the pressure of the can barrel portion by the can barrel pressure detection section, the can cover pressure detector carries out the can internal pressure inspection on the basis of the bulge of the can cover, with the result that, through the studies of these inspection results, the can internal pressure inspection can be done with a higher accuracy. Further, in cases where the internal pressure inspection object is changed to a can different in height dimension, and hence the separation between the can cover and the can cover pressure detector varies to cause the distance therebetween to become unsuitable for the inspection, the positioning unit moves and adjusts the apparatus body in the axial direction of the can with respect to the can carrying path, so that the separation between the can cover and the can barrel pressure detector can change to an appropriate distance.

In accordance with a further aspect of the present invention, a can internal pressure inspection apparatus comprises a can carrying conveyer for carrying a can in a state that the can takes an upright position and an apparatus body placed in relation to a can carrying path of the can carrying conveyer, and the apparatus body includes a can barrel pressure detection section and a can barrel guide section which are disposed to be in opposed relation to each other in a state where the can carrying path is interposed therebetween, and the can barrel pressure detection section has a can barrel pressure detector pressed against a barrel portion of the can. Further, the can barrel pressure detector is equipped with a presser for pressing the barrel portion of the can, biasing means for biasing the presser toward the barrel portion and a displacement sensor, for sensing the displacement of the presser while the biasing means has an elastic member for biasing the presser. Thus, when the can conveyed through the can carrying conveyer passes through the can barrel pressure detector, the presser is pressed against the barrel portion of the can by the help of the biasing force of the elastic member.

In the above-mentioned can internal pressure inspection apparatus, the biasing means includes a bias adjusting mechanisms for adjusting the biasing force of the elastic member by conducting the expansion and contraction of the elastic member. Thus, the pressing or intrusion quantity of the presser against or into the barrel portion of the can is adjustable through the operation of the bias adjusting mechanism.

Furthermore, in the above-mentioned can internal pressure inspection apparatus, a plurality of can barrel pressure detectors are provided, and the elastic member of the biasing means of at least one of the plurality of can barrel pressure detectors has an elastic modulus different from those of the elastic members of the biasing means of the other can barrel pressure detectors. Whereupon, in the case of the presser biased by the elastic member with a high elastic modulus, even if the internal pressure of the can is the same, its pressing quantity against the barrel portion of the can decreases as compared with those of the other pressers. On the other hand, in the case of the presser biased by the elastic member with a low elastic modulus, its pressing quantity against the can barrel portion increases as compared with those of the other pressers even if the internal pressure is the same. According to this invention, the can internal pressure is inspected through the use of the plurality of can barrel pressure detectors different in nature from each other, and the can internal pressure is finally inspected by, for example, averaging the detection results of the can internal pressure and by referring to the average value.

Moreover, in the above-mentioned can internal pressure inspection apparatus, the presser is supported to be rotatable and adjustable in position. With this structure, when the portion of the presser which is repeatedly brought into contract with the can barrel portion is abraded, the presser can be rotated and positioned so that a portion of the presser which is not yet worn off comes into contact with the can barrel portion.

BRIEF DESCRIPTION OF THE DRAWINGS

The object and features of the present invention will become more readily apparent from the following detailed description of the preferred embodiment taken in conjunction with the accompanying drawings in which.

DESCRIPTION OF THE PREFERRED EMBODIMENTS

A description will be made hereinbelow of an embodiment of the present invention with reference to the drawings.

Figure 1:
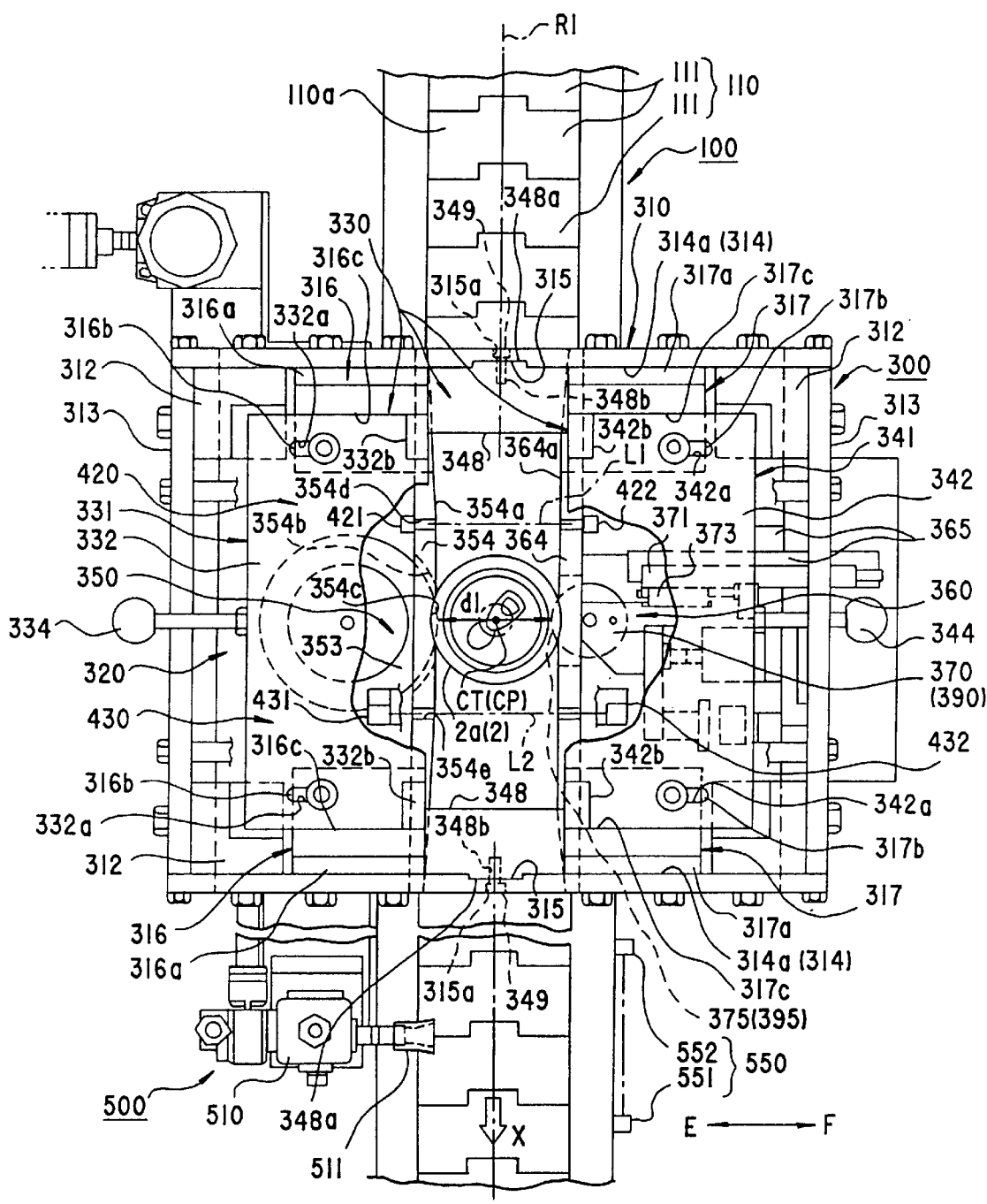
FIG. 1 is a plan view showing a can internal pressure inspection apparatus according to an embodiment of the present invention.
Figure 2:
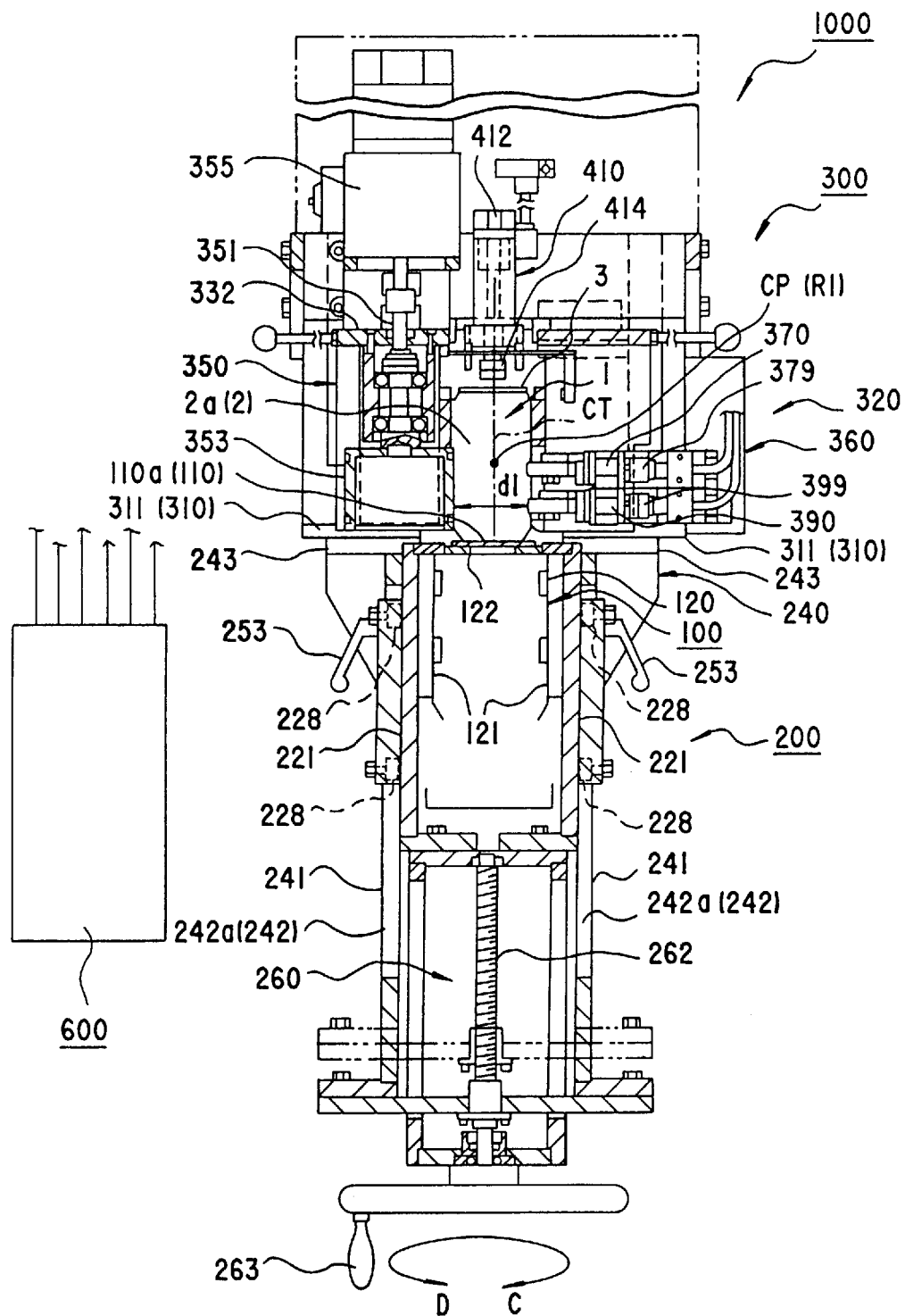
FIG. 2 is a front cross-sectional view showing the can internal pressure inspection apparatus as shown in FIG. 1.

As shown in FIG. 2 a can internal pressure inspection apparatus according to this embodiment generally designated as numeral 1000 has a belt conveyer 100 acting as a can carrying conveyer, a body elevation unit 200 attached to the belt conveyer 100 to function as a positioning unit, and an apparatus body 300 attached to the body elevation unit 200 to be lifted and lowered with respect to the belt conveyer 100. Also included in the can internal pressure inspection apparatus is a control unit 600 for controlling the apparatus body 300 and a defective can removal unit 500 shown in FIG. 1.

The belt conveyer 100, as shown in FIG. 1, includes a conveyer belt 110 with an endless structure which is constructed in such a manner that a number of plates 111 made of a metal are pin-coupled to each other to be rotatable as a whole. This conveyer belt 110 extends along a can carrying path R1 so that its upper surface serves as a horizontal carrying surface 110a. Although not shown, a chain is revolvingly provided on the inner surface of the conveyer belt 110. Through the rotation of a sprocket engaged with this chain, the carrying surface 110a of the conveyer belt 110 moves in a can carrying direction, i.e., in a direction indicated by an arrow X in the illustration. Further, the belt conveyer 100 is, as shown in FIG. 2, equipped with a supporting frame 120 for rotatably supporting the conveyer belt 110 through the aforesaid sprocket or the like. In the middle portion thereof, a cross section perpendicular to the can carrying path R1 has a rectangular configuration open downwardly. That is, the middle portion of the supporting frame 120 has a pair of side plate portions 121, 121 extending in parallel to each other within vertical planes and a horizontal plate portion 122 making a connection between the upper end portions of these side plate portions 121. The can carrying path R1 is a predetermined path where the center CP of a can 1 placed on the carrying surface 110a is designed to shift in accordance with the movement of the carrying surface 110a.

Figure 5:
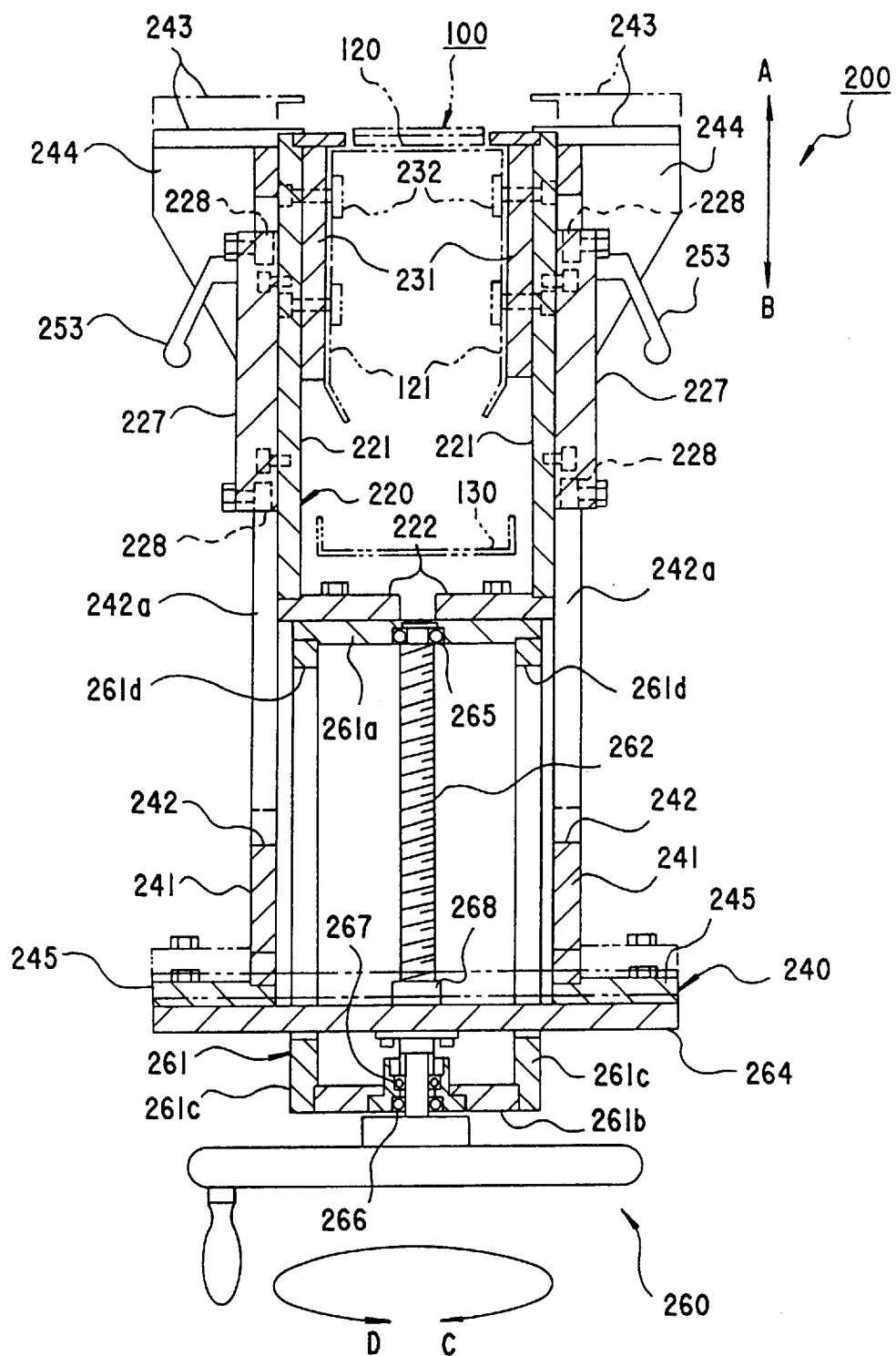
FIG. 5 a front cross-sectional view showing a body elevation unit of the FIG. 1 can internal pressure inspection apparatus.

The body elevation unit 200 is composed of a fixed frame 220 attached to the supporting frame 120 of the belt conveyer 100 provided in the manufacturing line of canning, elevation frames 240 having a mounting base for fixedly mounting the apparatus body 300, and elevation means 260 for raising an lowering the elevation frames 240. As shown in FIG. 5 the fixed frame 220 is provided with a pair of side plates 221 disposed to be in opposed relation to each other in a state where the both side plate portions 121 of the supporting frame 120 of the belt conveyer 100 are interposed through spacers 231 therebetween, and a fitting plate 222 fixedly fitted to the lower end portions of these side plates 221. The pair of side plates 221 are fitted through the spacers 231 to both the side plate portions 121 of the supporting frame 120 of the belt conveyer 100 by means of a number of bolts 232, 232. The belt conveyer 100 has a lubricating oil pan or reservoir 130 below the supporting frame 120. The spacers 231 are provided so that the side plates 221 do not come into contact with the lubricating oil pan 130.

Figure 6:
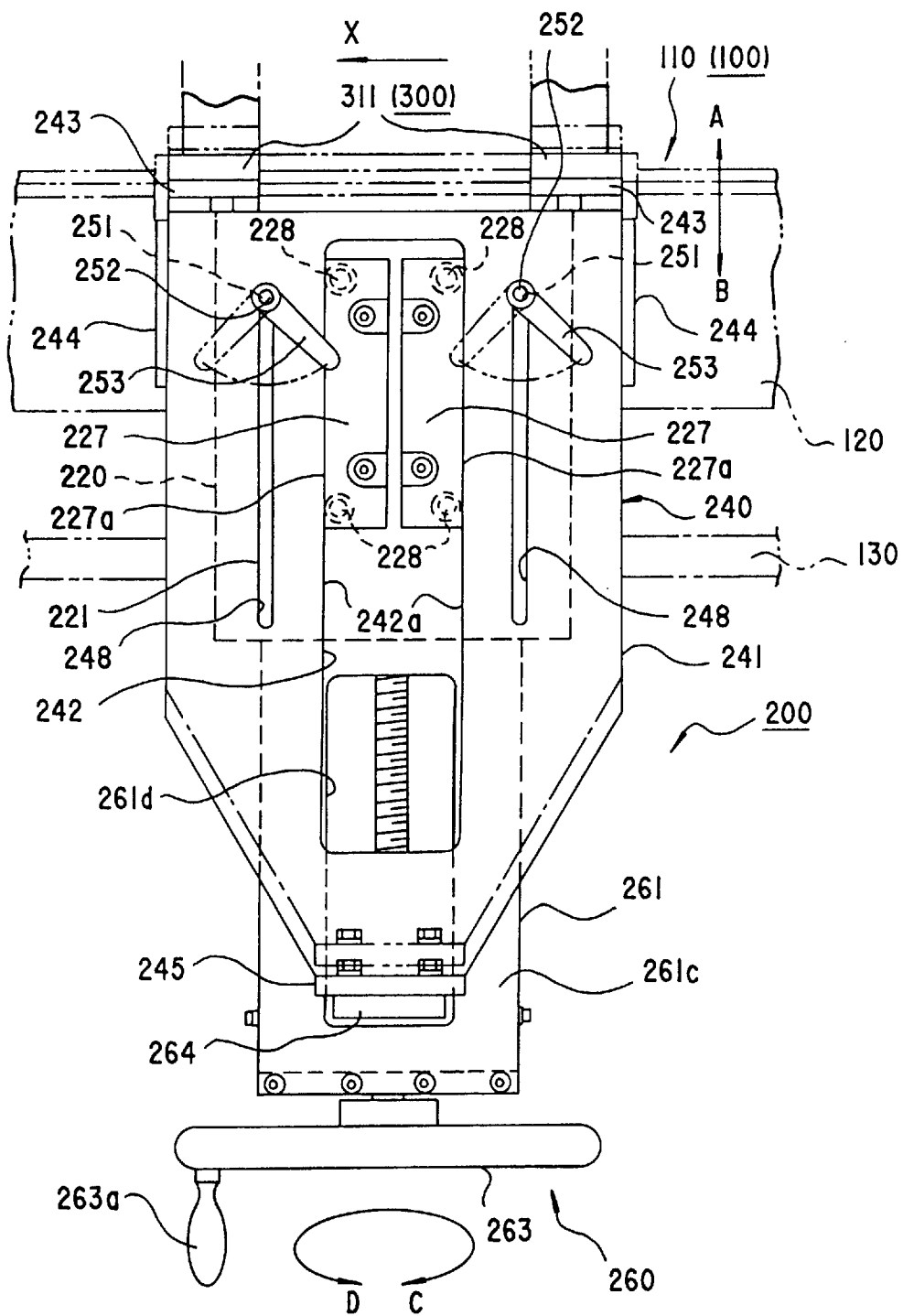
FIG. 6 is a side elevational view showing the FIG. 5 body elevation unit.

In addition, in the central portions of the outer surfaces of the pair of side plates 221, there are fixedly provided a pair of rectangular guide bodies 227 arranged side by side in the can carrying direction (arrow X direction) as shown in FIG. 6. In their guide bodies 227 disposed in the can carrying direction, their end surfaces in the can carrying direction side constitute vertical guide surfaces 227a. Further, the other end surfaces of the guide bodies 227 in the direction opposite to the can carrying direction also constitute vertical guide surfaces 227a. Guide rollers 228 supported by the guide bodies 227 are fitted to the upper and lower end portions of the guide surfaces 227a of the guide bodies to slightly protrude therefrom.

The aforesaid elevation frames 240 are disposed outside the side plates 221 of the fixed frame 220 to be in opposed relation to each other. Guide windows 242 extending vertically are made in central portions thereof and the elevation frames 240 are equipped with a pair of supporting plates 241 for locating the aforesaid guide bodies 227 and guide rollers 228 in the guide windows 242. Accordingly, the supporting plates 241, 241 are slidable up and down (that is, arrow A and B directions in the illustration) along the guide rollers 228 or the guide surfaces 227a of the guide bodies 227 in both side surfaces 227a of the guide bodies 227 in both side surfaces 242a of the guide windows 242. In addition, the elevation frames 240 are respectively attached through bolts to the front and rear end portions of the upper end surfaces of the supporting plates 241 in the can carrying direction (the arrow X direction in the illustration) so that they are adjustable in position in the directions perpendicular to the FIG. 6 paper surface. The elevation frames 240 are equipped with mounting plates 243 on which two bases 311 on each of the sides of the apparatus body 300 are mounted and fitted through bolts, reinforcing plates 244 located between the mounting plates 243 and the supporting plates 241 for supporting the mounting plates 243, respectively, and fitting plates 245 fixedly attached to the lower end portions of the supporting plates 241.

Furthermore, in the pair of supporting plates 241 of the elevation frame 240, a pair of through slits 248, 248 are made to extend vertically and to be disposed in a state where the guide windows 242 are interposed therebetween. Further, female screws 251 are embedded in portions of the side plates 221 of the fixed frame 220 corresponding in position to the slits 248. Still further, male screw members 252 pass through the slits 248 from the outside of the supporting plates 241 of the elevation frames 240 so that their tip portions are engaged with the female screws 251. The head portions of the male screw members 252 are pressed against the supporting plates 241 and released from the pressing condition against the supporting plates 241. The male screw, members 252 are, at their head portions, equipped with levers 253 for tightening or loosening the male screw members 252. Accordingly, by tightening the male screw members 252 using the levers 253, the supporting plates 241 of the elevation frames 240 can be pressed against the side plates 221 of the fixed frame 220 so that the elevation frames 240 are fixed to the fixed frame 220. In addition, with the male screw members 252 being loosened using the levers 253, the elevation frames 240 can be released from the fixing condition to the fixed frame 220.

As shown in FIG. 5 an elevation means 260 is provided between the fixed frame 220 and the elevation frames 240. The elevation means 260 is situated under the fitting plates 222 of the fixed frame 220. The elevation means 260 has a box-like supporting frame 261 attached through bolts to the fitting plates 222. Further, there is provided a screw bar 262 extending vertically and axially supported by the supporting frame 261 to protrude downwardly therefrom. A rotating handle 263 is fitted to the lower end portion of the screw bar 262 to rotate the screw bar 262 about its axis, i.e., in the directions indicated by arrows C and D. As a main component, there is provided a horizontal elevation plate 264 which is engaged through a female screw member 268 with a middle portion of the screw bar 262 and attached to the fitting plates 245 of the elevation frames 240 to be movable vertically in accordance with the rotation of the screw bar 262.

The supporting frame 261 includes a top plate 261a attached through bolts to the fitting plates 222 of the fixed frame 220 to support the upper end portion of the screw bar 262 in a state where a radial bearing 265 is placed therebetween, a bottom plate 261b placed under the top plate 261a to be in opposed relation to each other to support the lower portion of the screw bar 262 through a radial bearing 266 and a thrust bearing 267, and side plates 261c located between the top plate 261a and the bottom plate 261b. As shown in FIG. 6 the side plates 261c respectively have through rectangular windows 261d made in a horizontal direction perpendicular to the can carrying direction (that is, the arrow X direction) to extend vertically. Both the end portions of the elevation plate 264 protrude from the windows 261d of both the side plates 261c. The fitting plates 245 of the elevation frames 240 are attached through bolts to both the end portions of the elevation plate 264, respectively.

As shown in FIG. 2 the apparatus body 300 lifted and lowered by the aforesaid body elevation unit 200 is provided with a body frame 310 attached to the elevation frames 240 of the body elevation unit 200. On the body frame 310 there are mounted a can barrel pressure detection mechanism 320, a can cover pressure detection mechanism 410, a first can sensor 420 shown in FIG. 1, and a second can sensor 430, which serve as main components.

The body frame 310 is, as shown in fig.g 3, equipped with four bases 311 located on the mounting plates 241 of the elevation frames 240 and attached through bolts thereto, and leg selections 312 each having a horizontal cross section with an L-shaped configuration and placed vertically on the respective bases 311. In addition, the body frame 310 is, as shown in FIG. 1, provided with vertical beams 313 which have a plate-like configuration and whose end surfaces are joined to side surfaces of upper portions of the leg sections 312, of the four leg sections 312, in a line parallel to the can carrying path R1 and fixed with bolts thereto. The body frame 310 is also provided with horizontal beams 314 which have a plate-like configuration and whose end surfaces are joined to the opposite side surfaces of the upper portions of the leg sections 312, in a line normal to the can carrying path R1 and fixed with bolts thereto. Also, the body frame 310 is provided with gauge fitting recess portions 314 formed in the central portions of inner surfaces 314a of the horizontal beams 314, respectively. Further, included therein are a first movable frame supporting member 316 located at the left-hand side (left-hand side in the illustration) of the gauge fitting recess portions 314 in the inner surfaces 314a of the horizontal beams 314 and a second movable frame supporting member 317 situated at the right-hand side (right-hand side in the illustration) of the gauge fitting recess portions 315 in the inner surfaces 314a of the horizontal beams 314.

Figure 3:
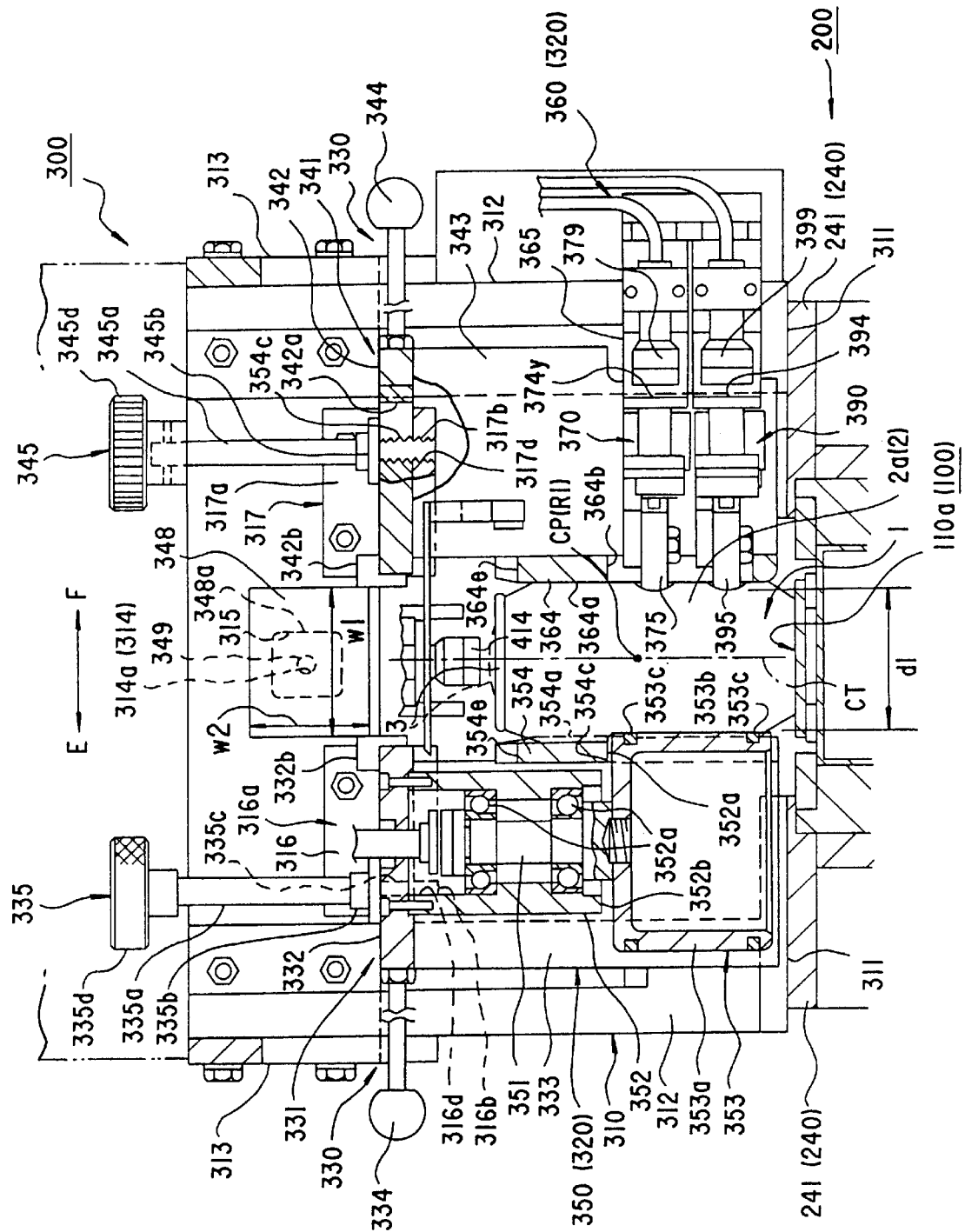
FIG. 3 is a front cross-sectional view showing an apparatus body of the FIG. 1 can internal pressure inspection apparatus.

As shown in FIG. 3 each of the gauges fitting recess portions 315 has a square configuration when viewed in a direction along the can carrying path R1. In the central portion of the gauge fitting recess portion 315, a screw fitting hole 315a is made to penetrate it. As shown in FIG. 1 the screw fitting hole 315a of the gauge fitting recess portion 315 coincides with the can carrying path R1 when viewed from the above. Further, the first and second movable frame supporting members 316, 317 are provided with fitting plate portions 316a, 317a joined through bolts to the inner surfaces 314a of the horizontal beams 314, horizontal plate sections 316b, 317b protruding horizontally and inwardly from the lower end portions of the fitting plate sections 316a, 317a, and guide blocks 316c, 317c formed in a stepwise fashion at the intersecting portions between the upper surfaces of the horizontal plate sections 316b, 317b and the inner surfaces of the fitting plate sections 316a, 317a and made to extend in the horizontal directions perpendicular to the can carrying path R1.

On the other hand, as shown in FIG. 3 a can barrel pressure detection mechanism 320 is disposed to be in opposed relation to a separation change mechanism(s) 330 in a state where the can carrying path R1 is interposed therebetween. Further, there are provided a can barrel guide section 350 and a can barrel pressure detection section 360, the separation d1 therebetween being changeable by means of the separation change mechanism 330. First, as shown in FIG. 1 the separation change mechanisms 330 is equipped with a first movable frame 331 provided on horizontal plate section 316b of the first movable frame supporting member 316 and disposed at the left-hand side of the can carrying path R1 to be in opposed relation thereto. The separation change mechanism 330 is further equipped with a second movable frame 341 provided on the horizontal plate section 317 of the second movable frame supporting member 317 and disposed at the right-hand side of the can carrying path R1 to be in opposed relation thereto. These first and second movable frames 331, 341 have rectangular slide plates 332, 342 whose both end portions are mounted on the upper surfaces of the horizontal plate sections 316b, 317b of the first and second movable frame supporting members 316, 317, and two guide fitting plates 333, 343 made to suspend from the slide plates 332, 342 as shown in FIG. 3. These guide fitting plates 333, 343 are located to be perpendicular to the can carrying path R1.

The slide plates 332, 343 of the first and second movable frames 331, 341 are made such that their both end surfaces in the directions of the can carrying path R1 are guided by the guide blocks 316c, 317c as shown in FIG. 1. The slide plates 332, 342 are movable in the horizontal directions, i.e., in the directions indicated by arrow E and F directions, perpendicular to the can carrying path R1. Pushing and pulling bars 334, 344 are attached to the central portion of the left-hand end surface of the side plate 332 of the first movable frame 331 and the central portion of the right-hand end surface of the slide plate 342 of the second movable frame 341, respectively. Accordingly, through the operation of the pushing and pulling bars 334, 344, the first and second movable frames 331, 341 can freely approach and separate from each other in a state that the can carrying path R1 is interposed therebetween.

Furthermore, vertically penetrating guide holes 332a, 342a are made in both the end portions of the slide plates 332, 342, i.e., the portions mounted on the horizontal plate sections 316b, 317b of the first and second moveable frame supporting members 316, 317. The respective guide holes 332a, 342a are elongated holes extending in the arrow E and F directions in the illustration. Further, in the respective horizontal plate sections 316b, 317b, female screws 316d, 317d are embedded or cut at the positions corresponding to the guide holes 332a, 342a as shown in FIG. 3. The female screws 316d, 317d accept fasteners 335, 345. That is, the fasteners 335, 345 are composed of body pins 335a, 345a, pressing rings 335b, 345b fixedly fitted over the lower portions of the body pins 335a, 345a for pressing the top surfaces of the slide plates 331, 341, male screw sections 335c, 345c formed at the lower end portions of the body pins 335a, 345a as shown in FIGS. 3 and 1 to extend to penetrate the guide holes 332a, 342a from the above side of the slide plates 332, 342 to engage with the female screws 316d, 317d, and handles 335d, 345d fitted over the upper end portions of the body pins 335a, 345a. Thus, when the handles 335d, 345d are held to tighten the fasteners 335, 345, the first and second movable frames 331, 341 can be fixedly secured to the body frame 310. Further, when the fasteners 335, 345 are loosened by the handles 335d, 345d, the release of the first and second movable frames 331, 341 from the body frame 310 is achievable.

In addition, as shown in FIG. 1, in the slide plates 332, 342 of the first and second movable frames 331, 341, both the end portions of their mutually opposed end surfaces in the directions of the can carrying path R1 have contact metal fittings 332b, 342b, respectively. Further, the separation change mechanism 330 is placed between the contact metal fittings 332b, 342b of the first and second movable frames 331, 341. The separation change mechanisms 330 is equipped with a width variable gauge(s) 348 for setting the separation between the first and second movable frames 331, 341 (that is, the separation d1 between the can barrel guide section 350 and the can barrel pressure detection section 360) in accordance with the contact of the contact metal fittings 332b, 342b, and a fitting screw such as a hexagon socket head cap screw 349 for fitting the width-variable gauge 348 in the gauge fitting recess portions 315 of the body frame 310.

The width variable gauge 348 substantially has a rectangular parallel piped configuration. When viewed from the face side, i.e., from the direction of the can carrying path R1, as shown in FIG. 3 the width variable gauge 348 has a rectangular configuration in which the vertical width w2 is smaller than the width w1 in the horizontal directions (the arrow E and F directions in the illustration) perpendicular to the can carrying path R1. In the rear surface of the width variable gauge 348 having a square configuration as shown in FIG. 1 which can be fitted in the gauge fitting recess portion 315. A female screw 348b is made in the central portion of the fitting projecting portion 348a. Further, the female screw 348a of the width variable gauge 348 accepts the fitting screw 349 inserted into the screw fitting hole 315a of the gauge fitting recess portion 315 from the rear surface side thereof. Thus, the width variable gauge 348 is fitted in the gauge fitting recess portion 315 of the body frame 310. Still further, the fitting screw 349 is loosened so that the fitting projection portion 348a is detached from the gauge fitting recess portion 315, and is rotated by 90 degrees, and then the fitting projection portion 348a is again fitted in the gauge fitting recess portion 315 and the fitting screw 349 is tightened. As a result, the width in the horizontal direction (the arrow E and F directions in the illustrations) normal to the can carrying path R1 can be shifted to a narrower width w2 as shown in FIG. 3.

The can barrel guide section 350 is attached to the first movable frame 331 of the separation change mechanism 330. More specifically, the can barrel guide section 350 is made up of a rotary shaft 351 which vertically penetrates the slide plate 332 of the first movable frame 331, a bearing device 352 for bearing the rotary shaft 351, a can feed roller 353 attached to the lower end portion of the rotary shaft 351, a guide plate 354 set to the can carrying path R1 sides of the guide fitting plates 333, 333 of the first movable frame 331, and an electric motor 355 placed on the top surface of the slide plate 332 as shown in FIG. 2 for rotationally driving the rotary shaft 351. In FIG. 3, the bearing device 352 comprises an angular contact ball bearing 352a for supporting the rotary shaft 351 and a housing 352b accommodating the angular contact ball bearing 352a and attached through bolts to the slide plate 332. The can feed roller 353 is composed of a cylinder 353a open downwardly and O rings 353c serving as a non-slip member and fixedly fitted in circumferential grooves made in upper and lower end portions of an outer circumferential surface 353b of the cylinder 353a around the rotary shaft 351.

As shown in FIG. 1, in the guide plate 354, its guide surface 354a extends in almost parallel to the can carrying path R1. In a central lower portion thereof, as shown in FIG. 3 a through roller window 354b is formed to allow viewing the outer circumferential surface 353b of the can feed roller 353. In the guide 354a, a can shoulder escape recess portion 354c is made above the roller window 354b. Further, in the upper end portion of the guide plate 354, sensor location notch portions 354b, 354e are made in the upstream side and downstream side of the can feed roller 353. Still further, sensor location through holes 354f, 354g are also made below the sensor location notch portions 345d, 354e.

Figure 8:
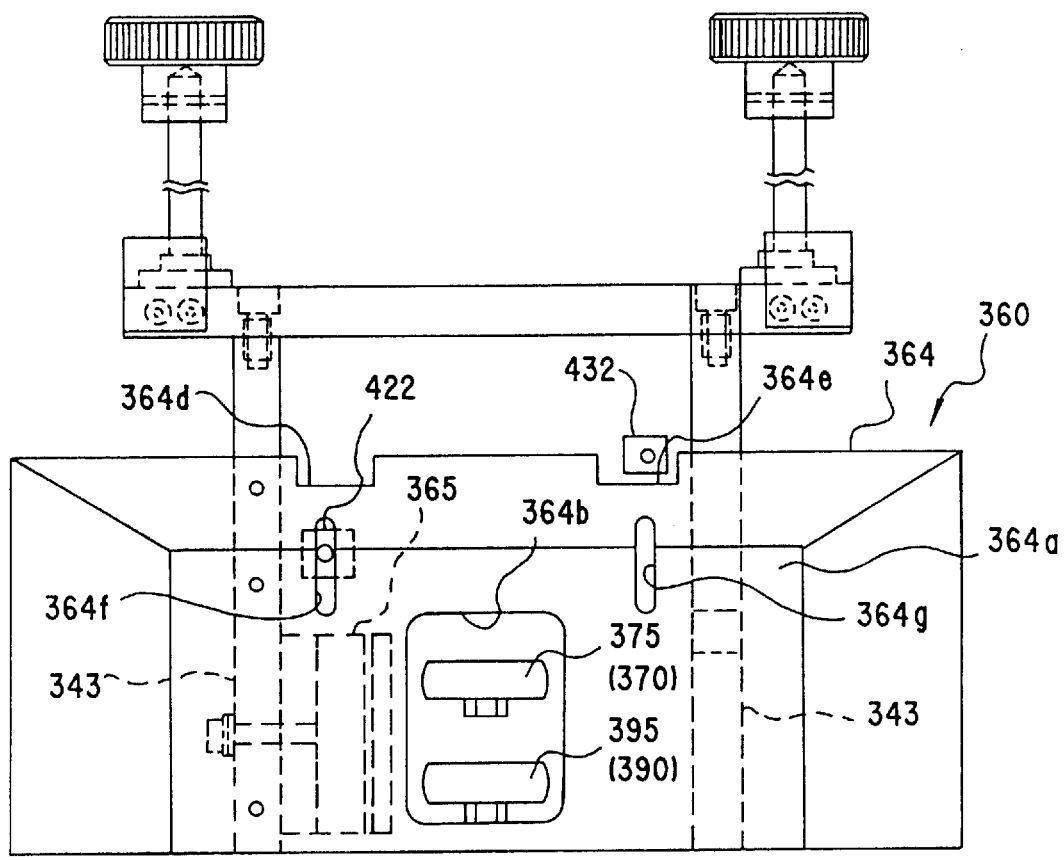
FIG. 8 shows a can barrel pressure detection section of the FIG. 3 can internal pressure inspection apparatus.

As shown in FIG. 3, the can barrel pressure detection section 360 is attached to the second movable frame of the separation change mechanism 330. More specifically, the can barrel pressure detection section 360 is composed of a guide plate 364 mounted on the can carrying path R1 end surfaces of the guide fitting plates 343, 343 of the second movable frame 341, and first and second can barrel pressure detectors 370, 390 serving as can barrel pressure detectors attached through a fitting plate 365 as shown in FIG. 8 to a side surface of the guide fitting plate 343. Further, these can barrel pressure detectors act as can pressure detectors. As shown in FIG. 1, the guide plate 364 has guide surface 364a extending substantial parallel to the can carrying path R1. In a central lower portion thereof, as shown in FIG. 3, a through detection window 364b is formed to allow looking into the first and second can barrel pressure detectors 370, 390. Further, in an upper end portion of the guide plate 364, as shown in FIG. 8, sensor location notch portions 364d, 364e are made in the upstream side and downstream side of the first and second can barrel pressure detectors 370, 390. Still further, sensor location through holes 364f, 364g are made below the sensor location notch portions 364d, 364e.

Figure 10:
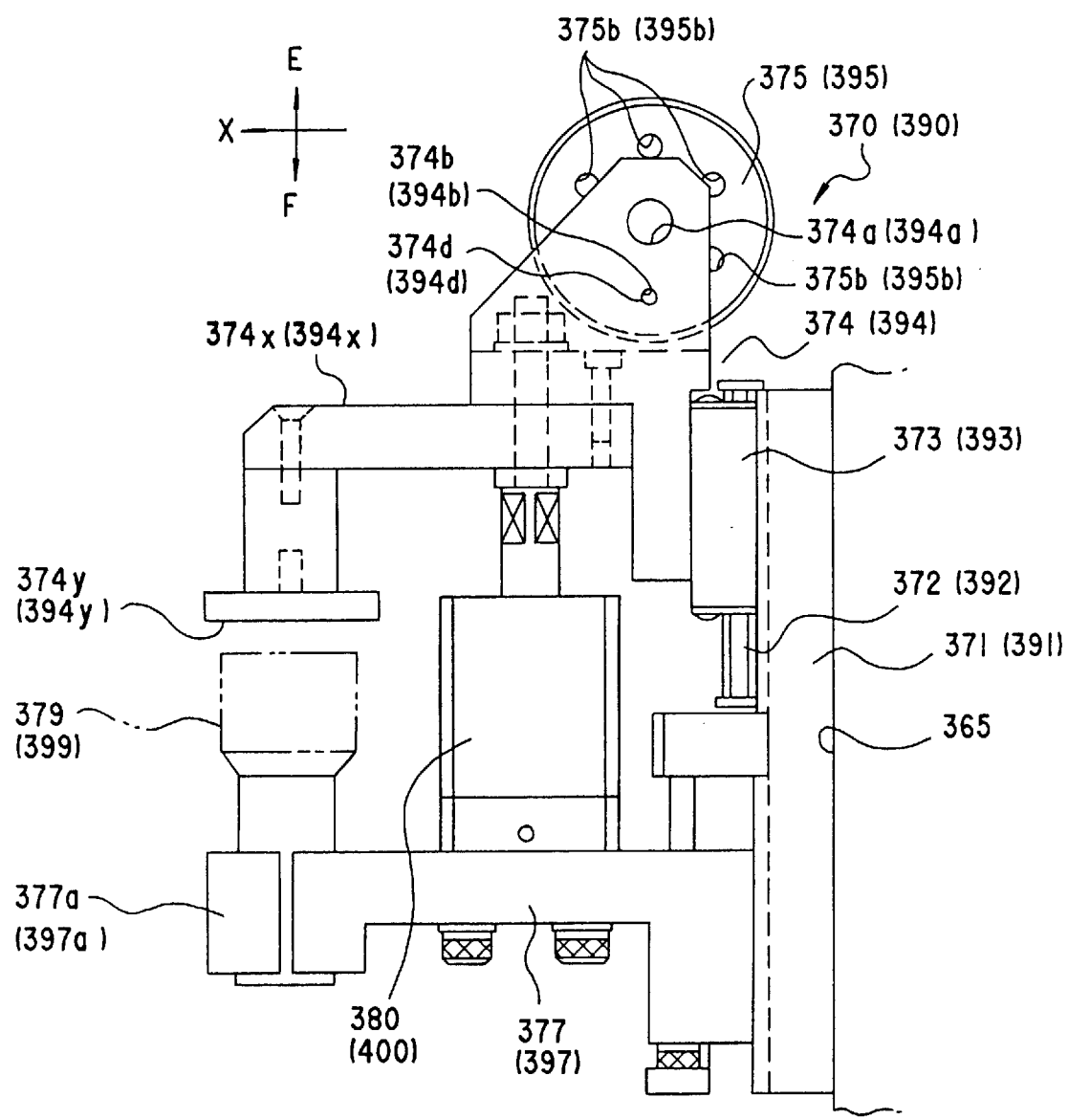
FIG. 10 illustrates first and second can barrel pressure detectors of the FIG. 8 can barrel pressure detection section.
Figure 13:
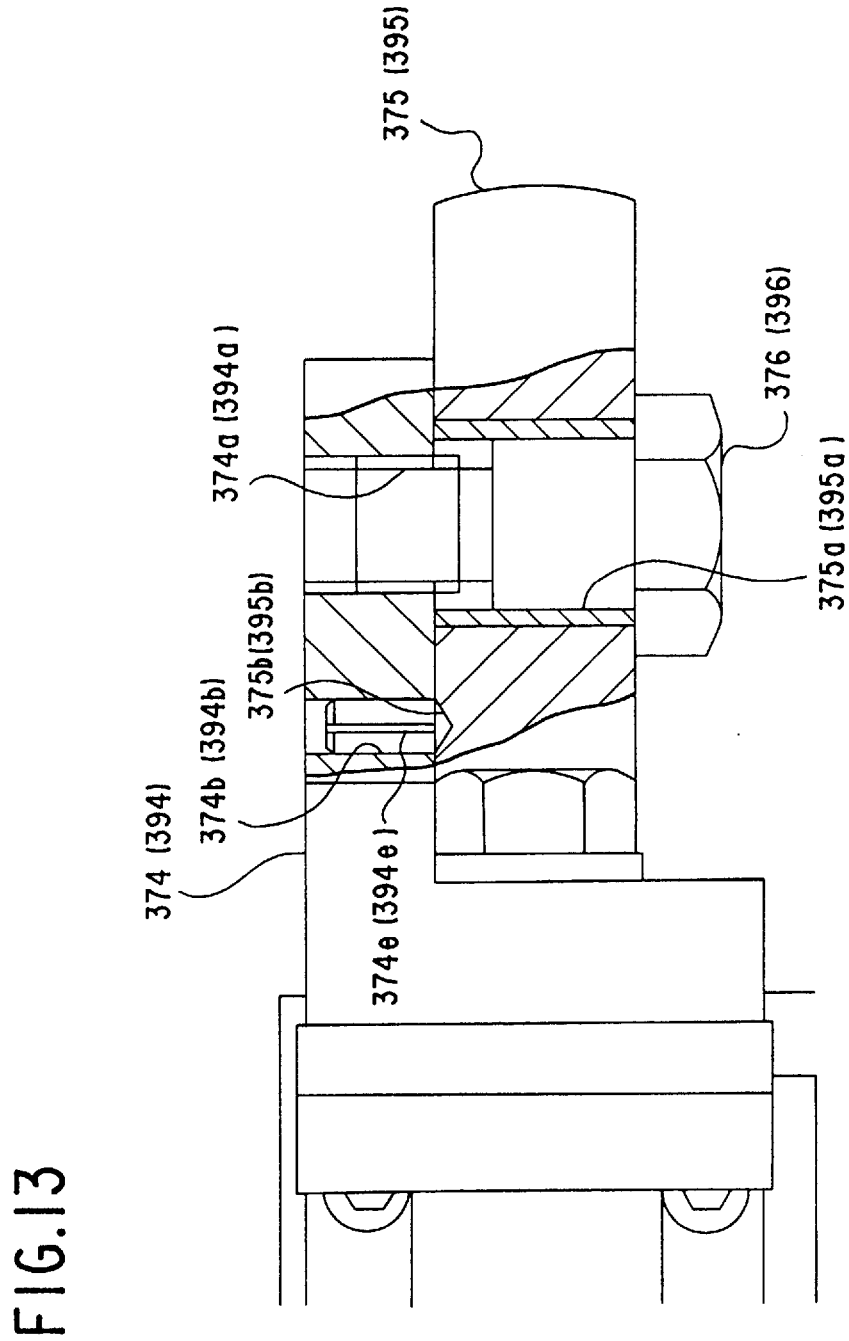
FIG. 13 is an illustration of first and second detection heads serving as pressers of the FIG. 10 first and second can barrel pressure detectors.

As shown in FIG. 10 the first and second can barrel pressure detectors 370, 390 have the following structure. That is, the first and second can barrel pressure detectors 370, 390 have bases 371, 391 (FIG. 10) joined through bolts to the fitting plate 365 and extending in the horizontal directions (the arrow E and F directions) perpendicular to the FIG. 1 can carrying path R1. Slide members 373, 393 slide on rails 372, 392, attached to the bases 371, 391, to be movable in the arrow E and F directions in the illustration. Also included therein are slide brackets 374, 394, having vertically (in the direction perpendicular to the FIG. 10 paper surface) penetrated female screw holes 374a, 394a and fixedly secured to the tip portions (the side portions in the direction of arrow E in the illustration) of the slide members 373, 393. In addition, first and second detection heads 375, 395, serving as pressers having a roller configuration and having pin holes vertically penetrating its central portion, are horizontally situated at the lower surface sides of the tip portions of the slide brackets 374, 394, as shown in FIG. 13. Further, pin bolts 376, 396 are inserted into the pin holes 375a, 395a of the first and second detection heads 375, 395 from below to be engaged with the female screw holes 374a, 394a. Still further, in the top surfaces of the first and second detection heads 373, 395, a number of hemispherical recess portions 375b, 395b are made at a given pitch in a circumferential direction around the pin bolts 376, 396 as shown in FIG. 10. The slide brackets 374, 394 have through holes 374b, 394b at the positions corresponding to the recess portions 375b, 395b. As shown in FIG. 13 spring pins 374e, 394e biased downwardly are set in the through holes 374b, 394b. The spring pins 374e, 394e are fitted in one of the recess portions 375b, 395b for stopping the rotation of the first and second detection heads 375, 395. In addition, the slide brackets 374, 394 are, as shown in FIG. 10, equipped with displacement detection arms 384x, 394x. The proximal portions of these displacement detection arms 374x, 394x protrude in the carrying direction (the arrow X direction in the illustration). The tip portions thereof are bent in the arrow F direction in the illustration. The end surfaces of the tip portions going in the arrow F direction in the illustration serve as reflection surfaces 374y, 394y for the detection of the displacement.

On the other hand, cylinder brackets 377, 397 are fixedly secured to the proximal portions, i.e., the arrow F side portions in the illustration, of the bases 371, 391 to protrude in the can carrying direction (the arrow X direction in the illustration). Between the central portions of the cylinder brackets 377, 397 and the slide brackets 374, 394 there are provided first and second biasing means 380, 400 for biasing the cylinder brackets 377, 397 toward the can carrying path R1 side, i.e., in the arrow E direction in the illustration. Further, the tip portions of the cylinder brackets 377, 397 constitute cylindrical sockets 377a, 397a there are inserted and attached first and second displacement sensors 379, 399 such as an eddy current type displacement sensor for detecting the displacements of the reflection surfaces 374y, 394y of the displacement detection arms 374x, 394x of the slide brackets 374, 394 in the arrow E and F directions in the illustration.

Figure 11:
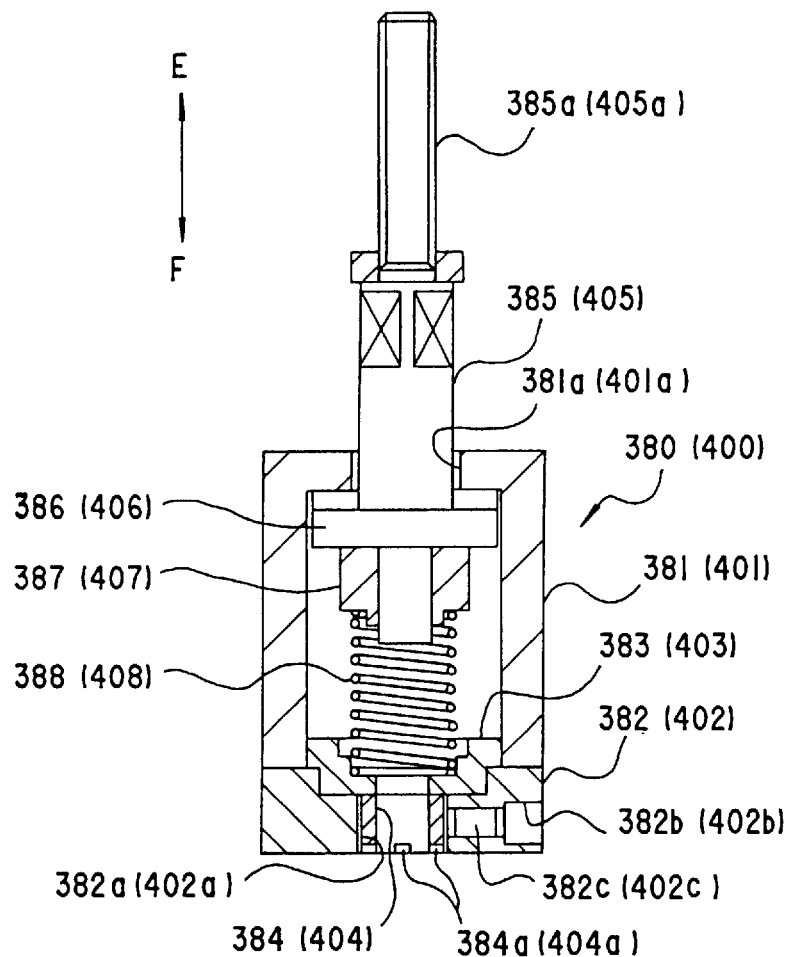
FIG. 11 illustrates first and second biasing means of the FIG. 10 first and second can barrel pressure detectors.

As shown in FIG. 11, the first and second biasing means 380, 400 have, as principal components, cylindrical cylinders 381, 401, rods 385, 405 movable in the arrow E and F direction in the illustration with respect to the cylinders 381, 401, and coil springs 388, 408 housed within the cylinders 381, 401 for biasing the rods 385, 405 in the arrow E direction in the illustration. The central portions of the end walls (the wall portions in the arrow E side in the illustration) of the cylinders 381, 401 have insertion holes 381a, 401a to accept the rods 385, 405. Ring-like gaps are defined between the wall surfaces of the insertion holes 381a, 401a and the outer surfaces of the rods 385, 405. Further, ring-like members 386, 406 are fixedly fitted in the proximal portions of the rods 385, 405 located within the cylinders 381, 401. The outer circumferential surfaces of the ring-like members 386, 406 are slidable in the arrow E and F directions in the illustration with respect to the inner wall surfaces of the cylinders 381, 401. Still further, in the proximal portions of the rods 385, 405, there are fixedly provided nestings 387, 407 in which the top portions of the coil springs 338, 408 are attached through the ring-like members 386, 406 to the proximal side. Male screws 385a, 405a are made on the tip portions of the cylinder 381, 401. These male screws 385a, 405a are engaged with the slide brackets 374, 394 as shown in FIG. 10.

Figure 12:
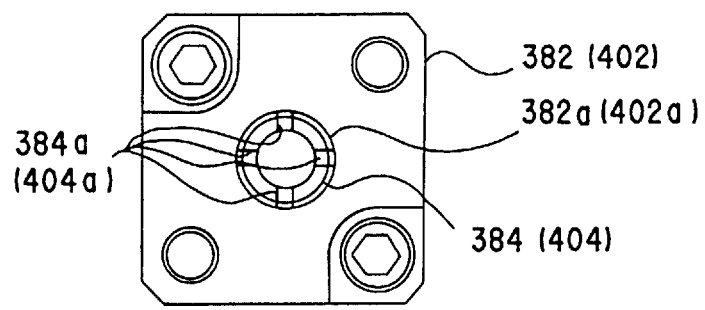
FIG. 12 is an illustration of bottom sections of the FIG. 11 first and second biasing means.

As shown in FIG. 11, within the cylinders 381, 401, there are placed holders 383, 403 to which the proximal portions of the coil springs 388, 408 are attached. The holders 383, 403 are slidable in the arrow E and F directions in the illustration with the respect to the inner wall surfaces of the cylinder 381, 401. In addition, the holders 383, 403 are brought into contact with bottom plates 382, 402 of the cylinders 381, 401 to be supported thereby. In the central portions of the bottom plates 382, 402 of the cylinders 381, 401, female screw holes 382a, 402a are made to have a diameter which can expose the central portions of the holders 383, 403. These female screw holes 382a, 402a are engaged with cylindrical pressing adjustment bolts 384, 404 for contracting and expanding the coil springs 388, 408. An adjustment mechanism is composed of the pressing adjustment bolts 384, 404, the female screw holes 382a, 402a of the bottom plates 382, 402 and the holders 383, 403. As shown in FIG. 12, cross grooves 384a, 404a are made in the end surfaces of the pressing adjustment bolts 384, 404.

Further, in the bottom plates 382, 402 of the cylinders 381, 401, through screw holes 382b, 402b are made from their side wall surfaces toward the outer surfaces of the pressing adjustment bolts 394, 404. The screw holes 382b, 402b come into engagement with fixing screw 382c, 402c for fixing the positions of the pressing adjustment bolts 384, 404 or for releasing them from the fixed conditions.

In this embodiment, the elastic modulus of the coiled spring 388 of the first biasing means 380 is set to be greater than that elastic modulus of the coil spring 408 of the second biasing means 400. The first and second can barrel pressure detectors 370, 390 are constructed as described above.

Figure 9:
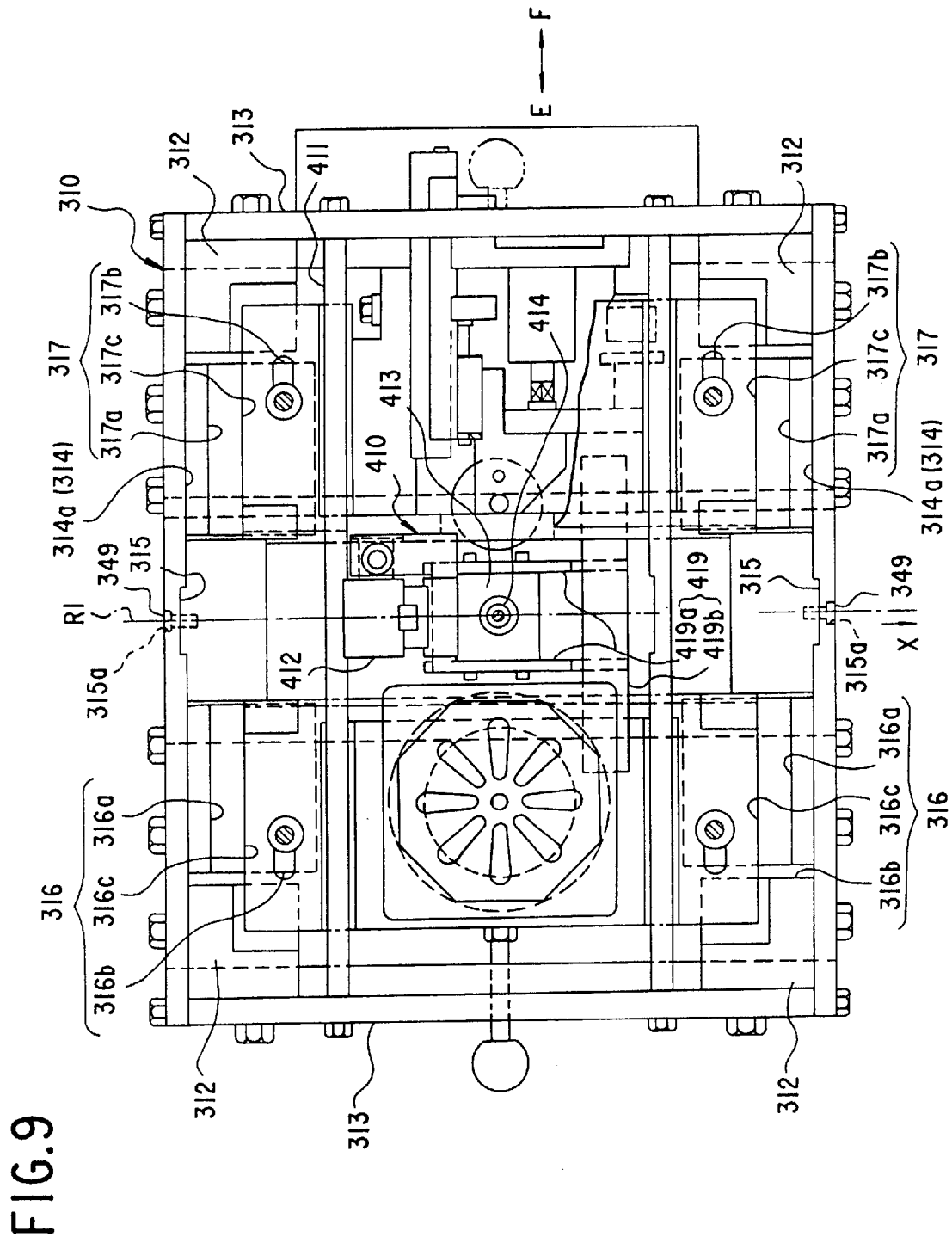
FIG. 9 is a plan view showing the FIG. 3 apparatus body.
Figure 14:
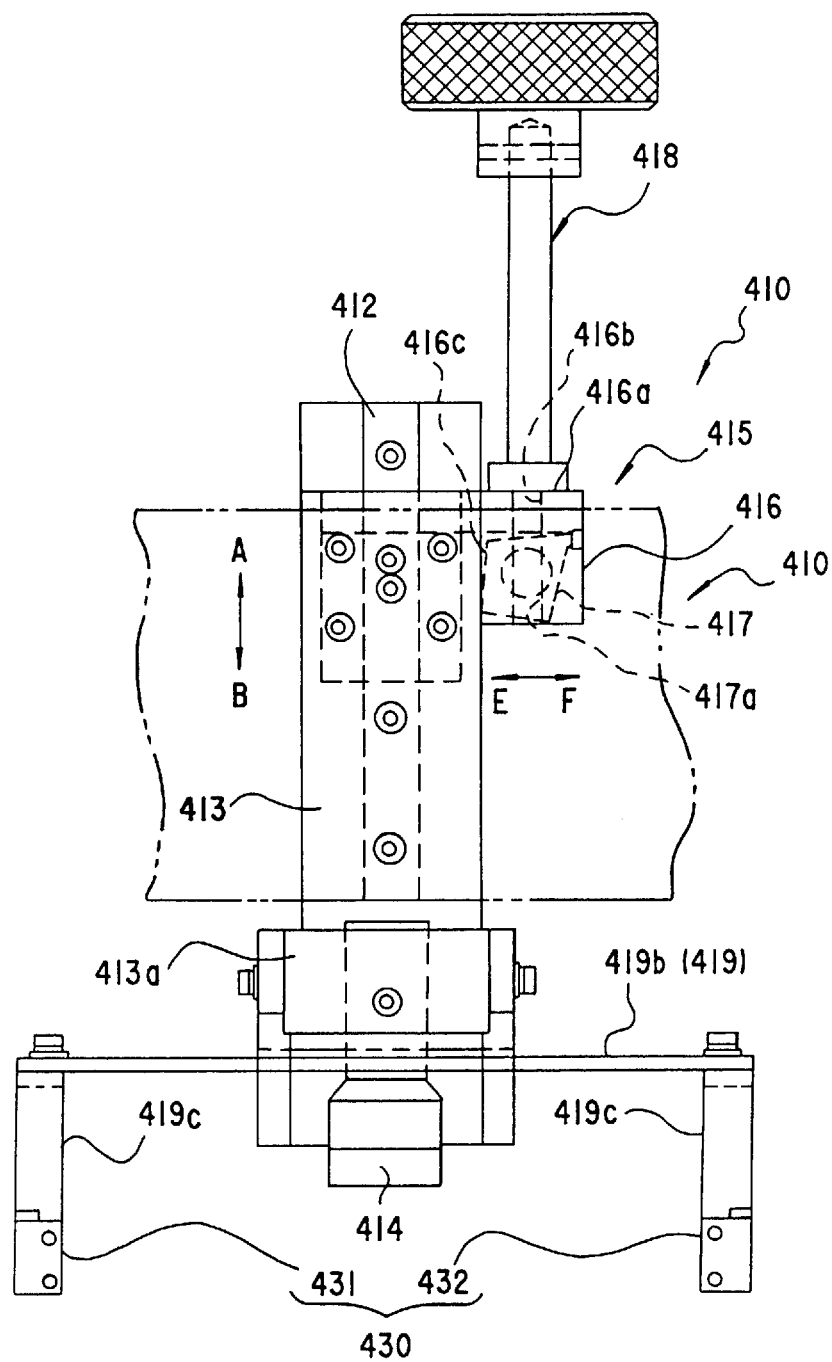
FIG. 14 is an illustration of a can cover pressure detector of the FIG. 3 apparatus body.

The can cover pressure detection mechanism 410 of the apparatus body 300 as shown in FIG. 2 is made up of a plate-like horizontal beam 411 stretched between the pair of vertical beams 313, 313 of the body frame 310 as shown in FIG. 9, a guide rail 412 joined through bolts to the central portion of the horizontal beam 411 to extend vertically as shown in FIG. 14, a sensor fitting member 413 which holds the guide rail 412 and which is slidable vertically, a can cover pressure detector 414 serving as a can pressure detector vertically attached to a lower end fitting section 413a of the sensor fitting member 413, and fixing means 415 for fixing the sensor fitting member 413 with respect to the guide rails 412 or for releasing it from the fixed condition. For example, an eddy current type displacement sensor is employed for the can cover pressure detector 414. The position of the can cover pressure detector 414 is set so that the upward extension line of the axis CT of a can 1 coincides with the center of the can cover pressure detector 414 when the can 1 is sandwiched between the can feed roller 353 of the can barrel pressure detection mechanism 320 and the first and second can barrel pressure detectors 370, 390.

The fixing means 415 of the can cover pressure detection mechanism 410 as shown in FIG. 14 is made up of a stopping piece housing case 416 fixed to the sensor fitting member 413, a stopping piece 417 housed in the stopping piece housing case 416 to be allowed to approach and separate from a side surface of the guide rail 412, and a fastener 418 for fixing the stopping piece 417 in a state where the stopping piece 417 is pressed against the side surface of the guide rail 412. The stopping piece housing case 416 is equipped with an upper plate 416a having a female screw 416b and an open end portion 416c disposed to be in opposed reaction to the side surface of the guide rail 412. The stopping piece 417 has a through hole 417a made to vertically penetrate it. Further, the fastener 418 is engaged with the female screw 416b of the upper plate 416a of the stopping piece housing case 416. The fastener 418 is inserted into the through hole 417a of the stopping piece 417 to fix the stopping piece 417 in a state where the stopping piece 417 is pressed against the side surface of the guide rail 412.

Furthermore, as shown in FIG. 9 a can sensor fitting member 419 is provided in the sensor fitting member 413 of the can cover pressure detection mechanism 410. The can sensor fitting member 419 is composed of two vertical members 419a, 419a protruding in the can carrying direction (the arrow X direction in the illustration) and a horizontal member 419b placed at end portions of the vertical members 419a, 419a to extend in the horizontal directions (the arrow E and F directions in the illustration) perpendicular to the can carrying direction.

Figure 7:
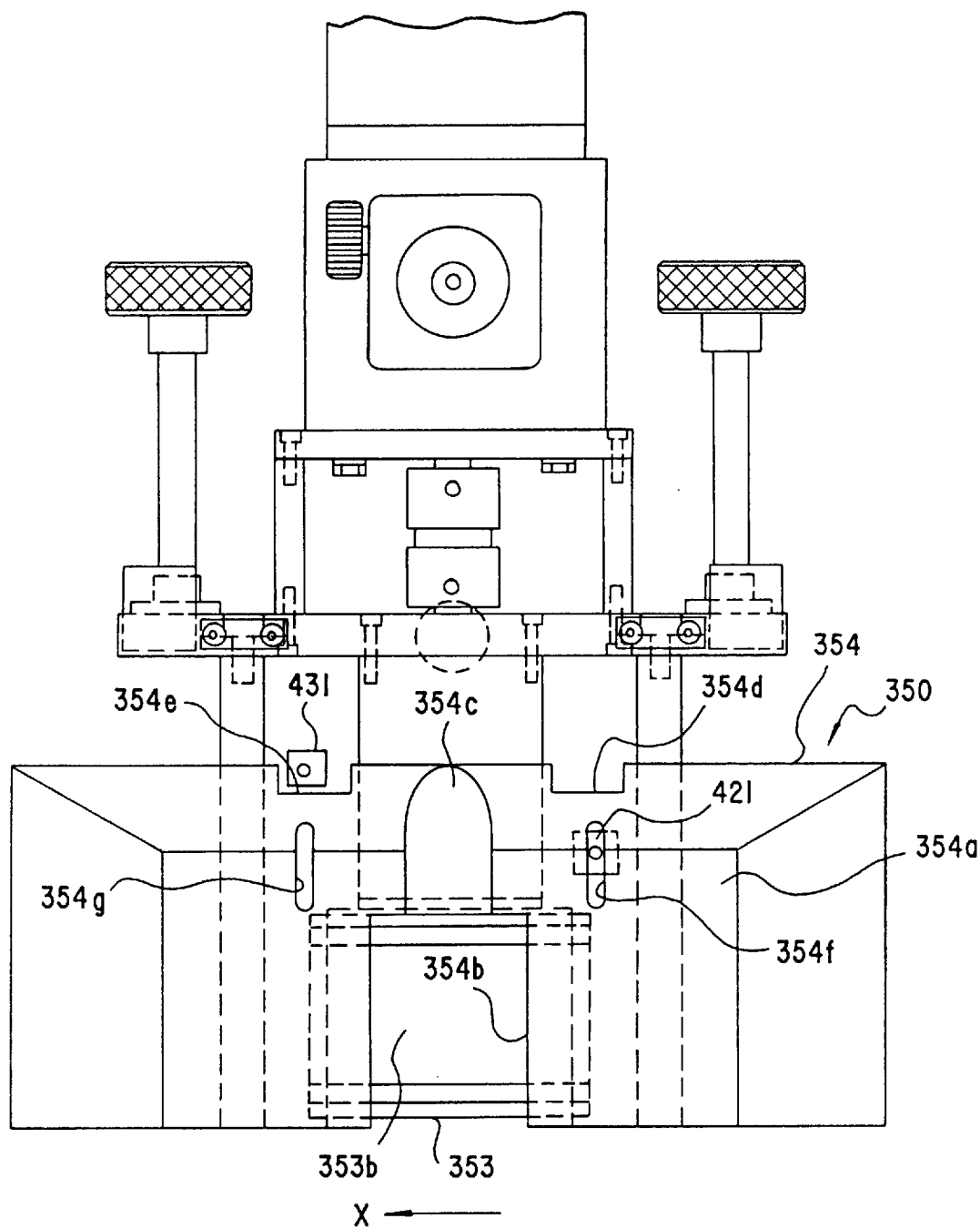
FIG. 7 shows a can barrel guide section of the FIG. 3 can internal pressure inspection apparatus.

The above-mentioned second can sensor 430 is a photoelectric sensor comprising a light emitting section 431 and a light receiving section 432 as shown in FIG. 14. The light emitting section 431 and the light-receiving section 432 are attached to both end fitting portions 419c, 419c of the horizontal member 419b of the can sensor fitting member 419. Thus, the second can sensor 430 is placed on the downstream side (the side in the direction of arrow X in the illustration) of the can carrying path R1 with respect to the positions of the can feed roller 353 of the can barrel pressure detection mechanism 320 and the first and second can barrel pressure detectors 370, 390 and the position of the can cover pressure detector 414 of FIG. 2. The light emitting section 431 is located at the back of the guide plate 354 of the can barrel guide section 350 when viewed from the above. The light receiving section 432 is situated behind the can barrel pressure detection section 360. A can sensing light beam L2 is produced between the light emitting section 431 and the light receiving section 432. Further, the light emitting section 431 is, as shown in FIG. 7, located on the sensor location notch portion 354e of the guide plate 354 of the can barrel guide section 350. The light receiving section 432 is, as shown in FIG. 8, placed on the sensor location notch portion 364e of the guide plate 364 of the can barrel pressure detection section 360.

The aforesaid first can sensor 420 is placed on the upstream side of the can carrying path R1 in FIG. 1 with respect to the positions of the can feed roller 353 of the can barrel pressure detection mechanism 320 and the first and second can barrel pressure detectors 370, 390 and the position of the can cover pressure detector 414 in FIG. 2. A light emitting section 421 as located at the back of the guide plate 354 of the can barrel guide section 350 when viewed from the above. A light receiving section 422 is situated behind the guide plate 164 of the can barrel pressure detection section 360. A can sensing light beam L1 is created between the light emitting section 421 and the light receiving section 422. Further, as shown in FIG. 7, the light emitting section 421 and the light receiving section 422. Further, as shown in FIG. 7, the light emitting section 421 is placed in the sensor location through hole 354f of the guide plate 354 of the can barrel guide section 350. The light receiving section 422 is, as shown in FIG. 8, placed in the sensor location through hole 364f of the guide plate 364 of the can barrel pressure detection section 360.

Figure 4:
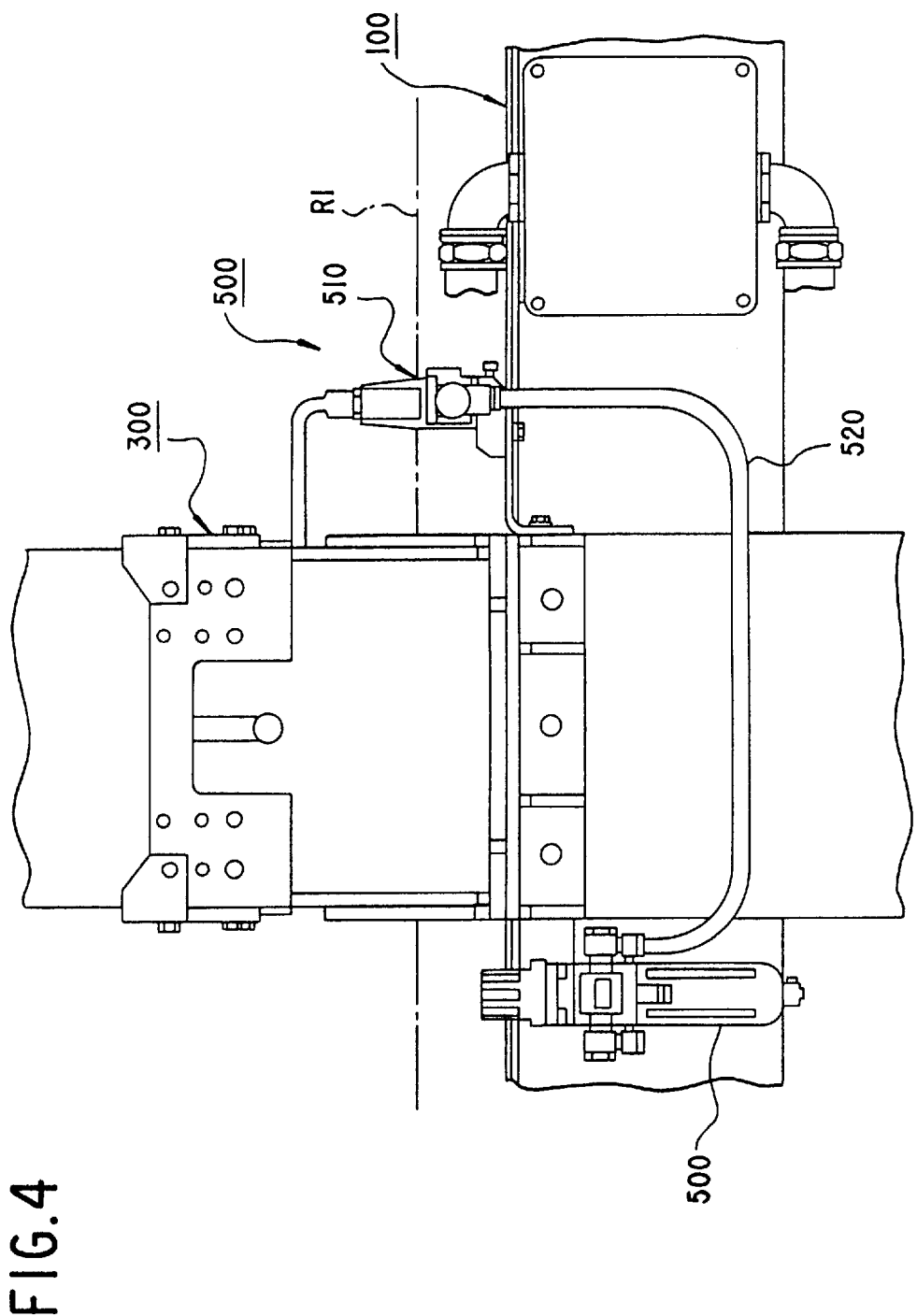
FIG. 4 is a side elevational view showing in can internal pressure inspection apparatus of FIG. 1.

On the other hand, an air discharging device 510 of the defective can removal unit 500 is located on the downstream side of the apparatus body 300 as shown in FIG. 1. The air discharging device 510 is attached to a side portion of the belt conveyer 100. This air discharging device 510 has an air nozzle 511 for discharging air in the horizontal direction perpendicular to the can carrying path R1. The air discharged blows away the defective can 1 out of the belt conveyer 100. The defective can removal unit 500 is connected through a force air feed pipe 520 to the air discharging device 510 as shown in FIG. 4. The defective can removal unit 500 is composed of an air pressure regulator 530 for regulating the air pressure to be fed to the air discharging device 510, and a defective can sensor 550 placed to be in opposed relation to the air discharging device 510 in a state such that the can carrying path R1 is interposed therebetween, as shown in FIG. 1. This defective can sensor 550 can be a transmission type sensor. A light emitting section 551 and a light receiving section 552 are place in parallel to the can carrying path R1.

Figure 15:
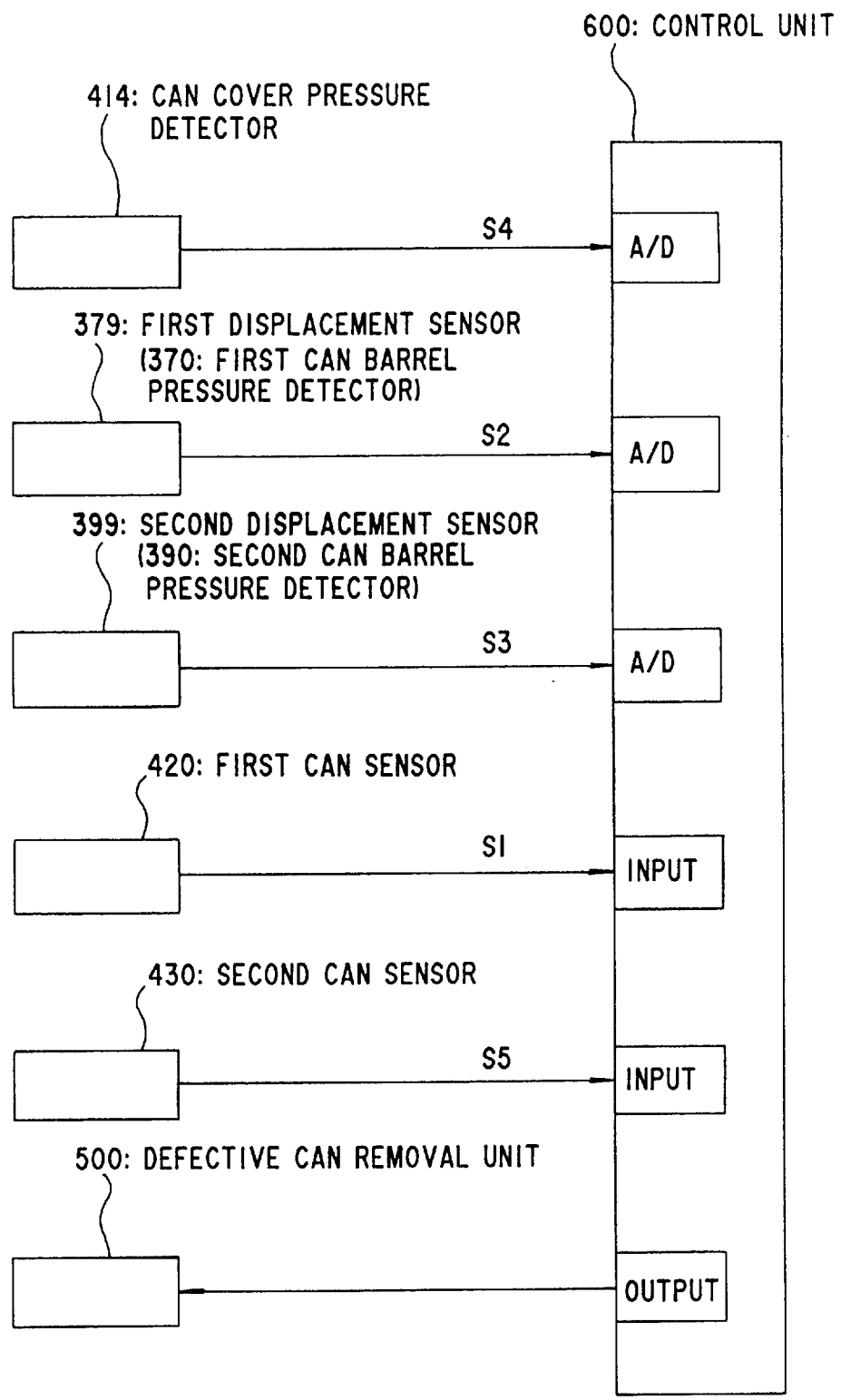
FIG. 15 is an illustration of a control unit of the FIG. 3 can internal pressure inspection apparatus.

As shown in FIG. 15, the control unit 600 is operably connected to the can cover pressure detector 414, the first displace sensor 379 of the first can barrel pressure detector 370, the second displacement sensor 399 of the second can barrel pressure detector 390, the first can sensor 420, the second can sensor 430 and the defective can removal unit 500. For example, the control unit 600 includes a central processing unit, a storage unit, an input/output unit for controlling the operation of the defective can removal unit 500 on the basis of electric signals from the can cover pressure detector 414, the first displacement sensor 379 of the first can barrel pressure detector 370, the second displacement sensor 399 of the second can barrel pressure detector 390, the first can sensor 420, and the second can sensor 430 as will be described in detail later. Other structures for controlling the operation will be obvious to those skilled in the art.

The can internal pressure inspection apparatus 1000 has the above-described structure and executes the following operations for inspecting the internal pressure with a high accuracy and further for removing the cans 1 defective in can internal pressure.

That is, before the inspection of the can internal pressure, as shown in FIG. 2, the rotating handle 263 of the body elevation unit 200 is rotated in an arrow C direction or an arrow D direction in the illustration so that the elevation from 240 is shifted up and down for adjustment. Thus, the apparatus body 300 attached onto the mounting plate 243 at the top end portion of the elevation frame 240 is adjustably-shifted up and down with respect to the carrying surface 110a of the belt conveyer 100, so that the height of the apparatus body 300 is determined to correspond with the height of the can 1 which is the object under the internal pressure inspection. This positioning adjustment permits the separation between the can cover pressure detector 414 and the cover of the can 1 to be detectable with a high accuracy. In addition, the positioning adjustment is made so that the height of the first and second can barrel pressure detectors 370, 390 coincides in position with the middle portion of the barrel section 2a of the can 1. In this embodiment, the first can barrel pressure detector 370 of the apparatus body 300 is positioned at the substantial center of the barrel section 2a of the can 1.

Furthermore, in the body elevation unit 200 of this embodiment, the pair of supporting plates 241, 241 (extending vertically and in parallel) of the elevation frame 240 are provided to slidably mate with the pair of side plates 221, 221 of the fixed frame 220, so that the supporting plates 241, 241 are supported without being inclined in the normal directions with respect to the side surfaces of the side plates 221, 221. In addition, since the rotary rollers 228 set to the side plates 221 are brought into contact with the side surfaces 242a of the guide windows 242 penetrating the supporting plates 241, the supporting plates 241 are further supported without being inclined in the horizontal directions parallel to the side surfaces of the side plates 221. With this structure, the elevation frame 240 can be supported by the fixed frame 220 to rise and lower without tilting. Moreover, the levers 253 are gripped and rotated as shown in FIG. 6 to tighten the male screw member 252 to the female screw member 251 in the side of the fixed frame 220. Accordingly, the elevation frame 240 can readily be fixed to the fixed frame 220.

Thus, the body elevation unit 200 can adjust the height of the apparatus body of FIG. 1, and the height adjustment of the apparatus body 300 can easily and quickly be made in accordance with the height dimension of the can 1. In addition, in cases where the internal pressure inspection object is changed to a can 1 different in height dimension and the separation between the cover 3 of the can 1 and the can cover pressure detector 414 assumes a distance unsuitable for the inspection (or in the case that the pressing heights of the first and second can barrel pressure detectors 370, 390 become unsuitable for the inspection), it is possible to readily change the can cover pressure detector 414 (or the heights of the first and second can barrel pressure detectors 370, 390) to the position suitable for the inspection.

Furthermore, the separation between the cover 3 of the can 1 and the can cover pressure detector 414 can also be changed as follows. That is, the fastener 418 of the fixing means 415 of FIG. 14 is loosened so as to release the stopping between the guide rail 412 and the sensor fitting member 413 due to the fixing means 415, and hence the can cover pressure detector 414, together with the sensor fitting member 413 attached thereto, becomes movable up and down along the guide rail 412. Accordingly, the can cover pressure detector 414 is shifted upwardly or downwardly and the fastener 418 of the fixing means 415 is again tightened. Thus, the separation between the cover 3 of the can 1 and the can cover pressure detector 414 as shown in FIG. 2 becomes easily changeable. The guide rail 412 is fixedly secured to the body frame 410, while the first and second can barrel pressure detectors 370, 390 are fixedly secured to the body frame 410. Accordingly, the can cover pressure detector 414 can freely be shifted and positioned up and down relative to the first and second can barrel pressure detectors 370, 390. For this reason, the heights of the first and second can barrel pressure detectors 370, 390 are adjustable by means of the aforesaid body elevation unit 200. When the can cover pressure detector 414 is thereafter adjusted in position along the aforesaid guide rail 412, the first and second can barrel pressure detectors 370, 390 and the can cover pressure detector 414 can be set to appropriate heights, respectively.

Going the other way, the separation d1 between the can barrel guide section 350 of the apparatus body 300 and the can barrel pressure detection section 360 including the first and second can barrel pressure detectors 370, 390 is adjusted as follows. That is, the fasteners 335, 345 are loosened to release the engagement between the first movable frame 331 supporting the can barrel guide section 350 and the body frame 310 and further to release the engagement between the second movable frame 341 supporting the can barrel pressure detection section 360 and the body frame 310. Thus, the first movable frame 331, together with the can barrel guide section 350, becomes movable in the horizontal directions (the arrow E and F directions in the illustration) perpendicular to the can carrying path R1. Further, the second movable frame 341, together with the can barrel pressure detection section 360, also becomes movable in the horizontal directions (the arrow E and F directions in the illustration) normal to the can carrying path R1. Incidentally, as shown in FIG. 1 the first movable frame 331 is mounted on the pair of first movable frame supporting members 316 extending in the arrow E and F directions in the body frame 310, and it is guided in a state in which it is sandwiched between the guide blocks 316c of the first movable frame supporting member 316 extending in the arrow E and F directions. The second movable frame 341 is placed on the pair of second movable frame supporting members 317 extending in the arrow E and F directions in the body frame 310, and it is guided in a state in which it is interposed between the pair of guide blocks 317c, 317c of the second movable frame supporting members 317, 317 extending in the arrow E and F directions. Accordingly, the moving direction is restricted with a high accuracy. Thus, the first movable frame 331 and the second movable frame 341 are operated in the manner that the pushing and pulling bars 334, 334 are gripped and pulled, with the result that they are separated from the width variable gauge 348 disposed therebetween.

Secondly, with the width variable gauge 348 disposed between the first movable frame 331 and the second movable frame 341, the fitting screw 349 fitted in the pair of gauge fitting recess portions 315 of the body frame 310 is loosened, with the result that the fitting recess portion 348a of the width variable gauge 348 is detached from the gauge fitting recess portions 315. Accordingly, the width variable gauge 348 becomes rotatable about the fitting screw 349. As shown in FIG. 3 the width variable gauge 348 may be rotated by 90 degrees, or may be left as it is. Then, the width of the width variable gauge 348 in the arrow E and F directions in the illustration is set to one of two widths w1 and w2 the width variable gauge 348 can take. The selection between these widths w1 and w2 is made in accordance with the diameter of the barrel section 2a of the can being the internal pressure inspection object. Further, the fitting screw 349 is again tightened, so that the fitting recess portion 348a of the width variable gauge 348 is fitted in the gauge fitting recess portions 315, 315 to fix the width variable gauge 348. Incidentally, since the fitting recess portion 348a of the width variable gauge 348 and the gauge fitting recess portions 315 have square configurations, they can fit together even if rotated by 90 degrees.

Subsequently, as shown in FIG. 1 the pushing and pulling bar 334 attached to the first movable frame 331 is gripped and operated so that the first movable frame 331 is shifted in the arrow F direction in the illustration. The contact metal fittings 332b, 332b constituting both the end portions of the first movable frame 331 are brought into contact with the width variable gauges 348, 348. In addition, the pushing and pulling bar 344 fitted to the second movable frame 341 is gripped and operated so that the second movable frame 341 is shifted in the arrow E direction in the illustration. Thus, the contact metal fittings 342b organizing both the end portions of the second movable frame 341 are brought into contact with the width variable gauge 348. Further, the aforesaid fasteners 335, 345 as shown in FIG. 3 are tightened so That the first and second moveable frames 331, 341 are fixed horizontally in the arrow E and F directions in the illustration.

Accordingly, the separation d1 between the can barrel guide section 350 supported by the first movable frame 331 and the can barrel pressure detection section 360 supported by the second movable frame 341 can assume a gap smaller by several hundreds micro millimeters to several millimeters than the diameter of the barrel section 2a of the can 1 which is the object of the internal pressure inspection. In addition, the can barrel guide section 350 and the barrel pressure detection section 360 can be set to an equal distance in a state where the can carrying path R1 is interposed posed therebetween. This separation d1 signified the separation between the can feed roller 353 of the can barrel guide section 350 and the second can barrel pressure detector 390 of the can barrel pressure detection section 360. The separation between the central portion of the guide surface 354a of the guide plate 354 of the can barrel guide section 350 and the central portion of the guide surface 364a of the guide plate 364 of the can barrel pressure detection section 360 is set to be greater than the separation d1. The mutual separation between the upstream sides of the guide surfaces 354a, 364a as shown in FIG. 1 gradually increase toward the upstream sides. Further, the separation between the downstream sides thereof also gradually increases toward the downstream side.

Thus, through the rotation of the width variable gauge 348, the separation d1 between the can barrel guide section 350 and the can barrel pressure detection section 360 is easily and quickly changeable in accordance with the diameter of the barrel section 2a of the can 1 which is the object of the internal pressure inspection.

From the above, in the can internal pressure inspection apparatus 1000 according to this embodiment, as shown in FIG. 2 the heights of the can barrel guide section 350, the can barrel pressure detection section 360 and the can cover pressure detector 414 and the separation d1 between the can barrel guide section 350 and the can barrel pressure detection section 360 are adjustable or changeable in accordance with the height of the can 1 which is the object of the internal pressure inspection and the diameter of the barrel section 2a thereof. For this reason, the internal pressure inspection for various kinds of cans different in dimension is possible and made easy.

The internal pressure inspection is carried out as follows after the adjustment or change corresponding to the dimensions of the can 1 which is the object under inspection. That is, first of all, the belt conveyer 100, the electric motor 355 of the apparatus body 300, the first and second displacement sensors 379, 399 of the first and second can barrel pressure detectors 370, 390, the can cover detector 414, the first and second can sensors 420, 430, as shown in FIG. 1, and the control unit 600, as shown in FIG. 2 are all started. Thus, the carrying surface 110a of the conveyer belt 110 of the can varying conveyer 100 starts to move at a constant speed along the can carrying path R1 in the arrow X direction in the illustration as shown in FIG. 1. The can feed roller 353 of the apparatus body 300 is rotated in the can carrying direction (in the arrow X direction in the illustration). Further, the first displacement sensor 379 of the first can barrel pressure detector 370 shown in FIG. 3 detects the distance up to the reflection surface 374y moving together with the first detection head 375. The first displacement sensor 379 continuously issues a voltage analog signal S2 corresponding to the detected distance to the control unit 600 as shown in FIG. 15. On the other hand, the second displacement sensor 399 of the second can barrel pressure detector 390 of FIG. 3 detects the distance up to the reflection surface 394y moving together with the second detection head 395 and continuously inputs a voltage analog signal S3 corresponding to the detected distance to the control unit 600. these signals S2 and S2 are equivalent to the pressing or intrusion quantity of the first and second detection heads 375, 395 (i.e., the protruding amounts from the detection window 364b) as shown in FIG. 3. At this time, the signals assume the maximum pressing quantities because the first and second detection heads 375 and 395 are not pressed against the can 1.

Furthermore, an analog signal S4 indicative of the distance from the can cover pressure detector 414 to the reflection surface positioned nearby under it is continuously inputted into the control unit 600 as shown in FIG. 15. In this case, the signal is representative of the distance up to the carrying surface 110a of FIG. 3. However, there is a possibility that the detection is difficult, because of a long distance. Moreover, the first and second can sensors 420, 430 of FIG. 1 respectively develop the can sensing light beams L1 and L2 between the light emitting sections 421, 431 and the light receiving sections 422, 432.

Secondly, the can 1, being the object under inspection, is placed on the upstream side end portion of the carrying surface 110a of the conveyer belt 110 in a state where it takes an upright position so that its can cover 3 looks upward. The can 1 is placed in such a manner in a previous process of the can manufacturing line. The can 1 placed on the carrying surface 110a of the belt conveyer 100 is carried at a constant speed toward the downstream side (in the arrow X direction in the illustration) along the can carrying path R1 in accordance with the movement of the carrying surface 110a. Then, the can 1 is introduced into the apparatus body 300 provided in the middle portion of the can carrying path R1. At this time, the can 1 advances under the horizontal beam section 314 of the body frame 310 of the apparatus body 300 and is introduced into between the upstream side portions of the pair of guide plates 354, 364 which are disposed to be in opposed relation to each other in a state where the can carrying path R1 is interposed therebetween. The guide surfaces 354a, 364a of the pair of guide plates 354, 364 are set such that the separation between the end portions of their upstream side portions thereof is slightly greater than the diameter of the barrel section 2a of the can 1. Since the guide surfaces 354a, 364a are made such that the separation therebetween gradually enlarges from the central portions toward the upstream sides, the smooth introduction of can 1 is possible. Further, with this structure, as the can is carried toward the central portions of the guide plates 354, 364, the can 1 is adjusted by both the guide plates 354, 364 so that the center CP thereof is positioned to coincide with the can carrying path R1 with a high accuracy.

Figure 16:
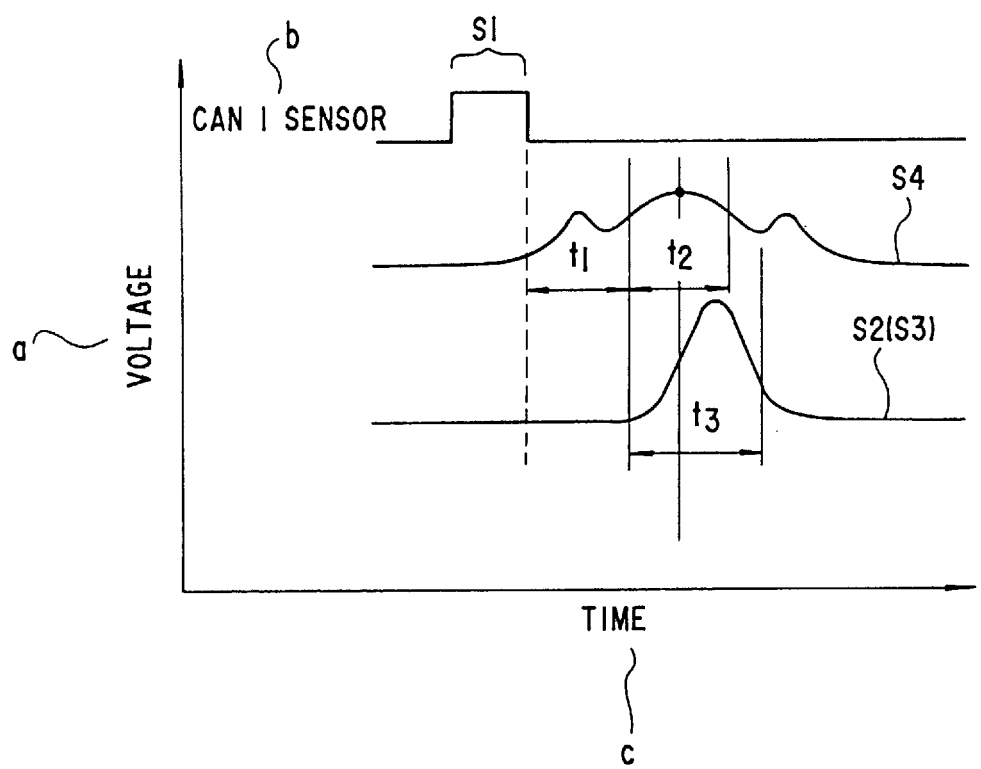
FIG. 16 is a graphic view showing a voltage of an electric signal inputted from a first can sensor into a control unit, a voltage of an electric signal inputted from a can cover pressure detector into the control unit, and a voltage of an electric signal inputted from first and second displacement sensors of first and second can barrel pressure detectors into the control unit, with respect to time.

When being transferred toward the central portions of the guide plates 354, 264, the can 1 crosses the can sensing light beam L1 of the first can sensor 420 located at a fixed position in the upstream side with respect to the central portions of the guide plates 354, 364. In response to this crossing, the first can sensor 420 issues a pulse signal S1 to the control unit 600 as shown in FIG. 15 because its light receiving section 422 does not receive the light beam L1 from its light emitting section 421. FIG. 16 shows this pulse signal S1. Thus, the control unit 600 of FIG. 15 starts a program on the basis of the pulse signal S1. On the other hand, as shown in FIG. 1, because the can is carried at a constant speed, the can 1 reaches the upstream side end portion of the roller window 354b in the central portion of the guide plate 354 until the elapse of a give time period t1 of FIG. 16 after the control unit 600 starts the program. At this time, the can cover pressure detector 414 of FIG. 3 is detecting the distance of the can carrying direction side portion of the panel section of the can cover 3 of FIG. 1. The first and second can barrel pressure detectors 370, 390 take a state immediately before coming into contact with the barrel section 2a of the can 1 this state is expressed by the analog signal S2 (S3) in FIG. 16.

Furthermore, as shown in FIG. 1 the barrel section 2a of the can 1 comes into contact with the can feed roller 353 which protrudes from the roller window 354b. Thereafter, it is shifter in the can carrying direction (the arrow X direction in the illustration) by the rotation of the can feed roller 353. In the meantime, the barrel section 2a of the can 1 comes into contact with the first and second roller-like detection heads 375, 395 which project from the detection window 364b in the central portion of the other guide plate 364, and then passes therethrough. The first and second detection heads 375, 395 are respectively pushed by the barrel section 2a of the can 1 to be returned slightly to the detection window 364b side. However, since the first and second detection heads 375, 395 are biased by the biasing means 380, 400 shown in FIG. 10, they press the barrel section 2a to intrude into the barrel section 2a of the can 1 (FIG. 3). The pressing quantity (the dented amount of the barrel section 2a of the can 1) is a function of the internal pressure of the can 1. As described before, the pressing quantities are detected by the first and second displacement sensors 379, 399 of the first and second can barrel pressure detectors 370, 390, the distances to the reflection surfaces 374y, 394y respectively moving together with the first and second detection heads 375, 395. The voltage analog signal S2 in FIG. 16 corresponding to the distance is inputted into the control unit 600 as shown in FIG. 15.

Furthermore, the can cover pressure detector 414 in FIG. 3 also detects the distance from the upstream side portion of the panel section of the can cover 3 of the can 1 to the downstream side portion of the panel section thereof while the can 1 carried through the can feed roller 353. The analog signal S4 in FIG. 16 corresponding thereto is inputted into the control unit 600 as shown in FIG. 15. At this time, as shown in FIG. 1, the can 1 is carried in the can carrying direction (the arrow X direction in the illustration) by the rotation of the can feed roller 353. Thus, the can 1 is rotated about its own axis CT and shifted without slipping on the arc-like outer surfaces of the first and second detection heads 375, 395, which can prevent damage or injury to the outer surface of the barrel section 2a of the can 1. In addition, in the guide surface 354a of the guide plate 354, as shown in FIG. 3, the can shoulder escape recess portion 354c is made above the can feed roller 353, and hence, the can 1 shoulder portion is put into the can shoulder escape recess portion 354c, with the result that the can 1 shoulder portion, which is hard to dent, is prevented from strongly contacting the guide surface 354a of the guide plate 354 so that the frictional force between the can 1 shoulder portion and the guide surface 354a of the guide plate 354 is decreased. Accordingly, it is possible to avoid the spinning or slip of the can feed roller 353 with respect to the middle portion of the barrel section 2a. In addition, it is possible to convey the can 1 at an accurately constant speed.

After the elapse of a fixed or given time period t1 from the input of the pulse signal S1 from the first can sensor 420 as shown in FIG. 16, during a fixed time period t2 from that time, the control unit 600 calculates and detects the bulge or expansion quantity of the can cover 3 indicated by a dotted line in FIG. 3 on the basis of the analog signal S4 inputted from the can cover pressure detector 414 as shown in FIG. 15. In this case, the analog signal S4 shown in FIG. 16 is converted into a digital signal. The peak value during the fixed time period t2 is calculated and detected and is treated as the bulge amount of the can cover 3. During the fixed time period t2, the can cover pressure detector 414 of FIG. 3 detects the distance from the upstream side portion of the panel section of the can cover 3 as shown in FIG. 1 to the downstream side portion of the panel section. This time period t2 is set in advance on the basis of the carrying speed of the can 1. Further, the can 1 is adjusted and positioned so that the center CP of the can 1 coincides with the can carrying path R1 with a high accuracy. The can cover pressure detector 414 is placed right above the can carrying path R1. Accordingly, the can cover pressure detector 414 can assuredly detect the distance to the peak point of the bulge of the panel section of the can cover 3 during that time period.

Moreover, after the elapse of the fixed time period t1 from the input of the pulse signal S1 from the first can sensor 420 as shown in FIG. 16, during a fixed time period t3 from that time, the control unit 600 shown in FIG. 15 calculates and detects the pressing quantity against the barrel section 2a of the can 1 in FIG. 3 on the basis of the analog signals S2 and S3 inputted from the first and second displacement sensors 379, 399, as shown in FIG. 15. In this case, the analog signals S2 and S3 in FIG. 16 are converted into digital signals. The respective peaks values are calculated and detected during the fixed time period t3. These peak values are averaged and treated as the pressing quantity against the barrel section 2a of the can 1 in FIG. 3. That is, a plurality of pressing quantities against the middle portion of the barrel section 2a of the can 1 are simultaneously detected and averaged. Accordingly, the detection of the pressing quantity against the barrel section 2a of the can 1, i.e., the detection of the can internal pressure, is possible with a high accuracy. As shown in FIG. 16 the fixed time period t3 is previously determined on the basis of the carrying speed of the can 1 in FIG. 1 to exceed the time period until the center CP of the can 1 passes through the first and section detection heads 375, 395.

The control unit 600 shown in FIG. 15 compares the calculated and detected pressing quantity against the barrel section 2a of the can 1 in FIG. 3 with a reference pressing quantity inputted in advance to decide whether the can 1 is acceptable or not. Similarly, the control unit 600 compares the bulge quantity of the can cover 3 calculated and detected with a reference bulge amount inputted in advance to decide the acceptance or failure of the can 1. When at least one of the pressing quantity or bulge quantity is unacceptable, the internal pressure of that can 1 is determined to be unacceptable. Accordingly, the control unit 600 decides the acceptance for failure in the internal pressure on the basis of the pressing quantity against the barrel section 2a in the can 1 and the bulge amount of the can cover 3, which can ensure the detection of the failure in the can internal pressure with a higher accuracy.

After in FIG. 1 the can 1 separates from the can feed roller 353, it is carried through the belt conveyer 100 to cross the can sensing light beam L2 of the second can sensor 430. The second can sensor 430 supplies a pulse signal S5 (a can sense signal) to the control section 600 as shown in FIG. 15 on the basis of the fact that the light receiving section 432 does not receive the light beam L2 from the light emitting section 432. Further, in FIG. 1 the can 1 is further shifted along the can carrying path R1 while being guided by the downstream side portions of the guide plates 352, 364, and then goes under the horizontal beam section 314 of the body frame 310 to be discharged from the apparatus body 300, before being carried toward the air nozzle 511 of the air discharging device 510 of the defective can removal unit 500.

On the other hand, if the can internal pressure shows a failure, when the pulse signal S5 is inputted from the second can sensor 430, the control unit 600 shown in FIG. 15 starts the defective can removal unit 500 after the elapse of a given time period from that time, on the basis of the pulse signal S5 and the failure decision. This given time period signifies the time period until the can 1 reaches the air nozzle 511 of the air discharging device 510 after passing through the second can sensor 4430. Accordingly, the can 1 defective in the internal pressure is blown away from the belt conveyer 100 by the air discharged from the air nozzle 511 to be taken out when passing through the air nozzle 511 of the air discharging device 510. At this time, the start-up of the defective can removal unit 500 is made on the basis of the pulse signal S5 from the second can sensor 430 sensing the can 1 after the can 1 passes through the can feed roller 353. Accordingly, for example, as compared with the case that the defective can removal unit is started on the basis of the pulse signal S1 from the first can sensor 420, the waiting time from the sensing of the can 1 to the start-up of the defective can removal unit can shorten. In addition, even if the friction with the first and second can barrel pressure detectors 370, 390 and the guide plates 354, 364 occurs of if the carrying speed of the can 1 is shifted from the predetermined speed because of carrying it through the can feed roller 353, after the influence therefrom substantially disappears, the defective can removal unit 500 is started on the basis of the pulse signal S5 from the second can sensor 430 sensing the can 1. Accordingly, it is possible to operate the air discharging device 510 at the time when the defective can 1 is correctly positioned with respect to the air discharging device 510 of the defective can removal unit 500 with a high degree of accuracy, which can reduce or eliminate the possibility that errors take place in the removal of the defective can 1. This means that it is possible to lessen or omit the manual defective can removing operations. Thus, the can internal pressure inspection becomes simple. Incidentally, when the defective can 1 is blown away by the air discharging device 510, it is detected by the defective can sensor 550. Further, in the case that the defective can sensor 550 does not sense the defective can 1 within a given time period after the start-up of the defective can removal unit 500, the belt conveyer 100 is stopped, allowing the defective can 1 to be taken off manually.

Moreover, in this embodiment, the first and second biasing means 380, 400 in FIG. 10, which press the first and second detection heads 375, 395 of the first and second can barrel pressure detectors 370, 390 against the barrel section 2a of the can 1, use the restoring forces of the coil springs 388, 404 as their biasing forces. Thus, it is not necessary to ensure the airtightness, unlike the prior art which uses an air cylinder to produce the biasing force. Accordingly, there is no need for the rods 385, 405 to be guided in a contact condition with the insertion holes 381a, 405 to be guided in a contact condition with the insertion holes 381, 401 or with the interiors of the cylinders 381, 401. For this reason, in the case that the rods 385, 405 repeatedly reciprocate in connection with the first and second detection heads 375, 395 in FIG. 10, the occurrence of seizure can be reduced, as compared with the air cylinder type, which can lengthen the life of the first and second can barrel pressure detectors 370, 390 to reduce the frequency of their replacement.

Furthermore, according to this embodiment, in the first and second biasing means 380, 400, as shown in FIG. 11 the pressing adjustment bolts 384, 404 can be tightened or loosened to easily move and adjust the holders 383, 403 attached to ends of the coil springs 388, 408. Thus, it is possible to adjust the pressing forces against the barrel section 2a of the can 1 by means of the expansion and contraction of the coil springs 388, 408. This can prevent the detection accuracy of the can internal pressure from lowering because of the extreme decrease or increase in the pressing quantity even in the case of the can different in internal pressure, which can ensure the accurate can internal pressure detection for the cans of the type different in internal pressure.

Still further, in the first and second detection heads 375, 395, as shown in FIG. 1, in cases where the portions repeatedly brought into contact with the barrel section 2a of the can 1 are worn off, the first and second detection heads 375, 395 can be rotated to change the recess portions 375b, 395b which are made to engage with the spring pins 374e, 394e as shown in FIG. 10, whereupon the portions of the first and second detection heads 375, 395 which are not worn down can newly be brought into contact with the barrel section 2a of the can 1. This can improve the inspection accuracy and lengthen the life of the first and second detection heads 375, 395. Accordingly, it is possible to mitigate the replacement working, and hence to further simplify the can internal pressure inspection.

Moreover, according to this embodiment, in FIG. 11 the elastic modulus of the coil spring 388 of the first biasing means 380 is set to be greater than that of the coil spring 408 of the second biasing means 400. In the case of the coil spring 388 with a higher elastic modulus, the error in the corresponding relation between the pressing quantity against the can 1 with the higher elastic modulus, the error in the corresponding relation between the pressing quantity against the can 1 with a high internal pressure and the can internal pressure can be lessened. On the other hand, in the case of the coil spring 4078 with a low elastic modulus, the error in the corresponding relation between the pressing quantity against the can 1 with a low internal pressure and the can internal pressure can be reduced. Accordingly, if the can internal pressure is high, the pressing quantity can be detected with a high accuracy by using the first can barrel pressure detector 370 in FIG. 3 biased by the coil spring 388 with the high elastic modulus. This can compensate for the detection error due to the second can barrel pressure detector 390. On the other hand, if the can internal pressure is low, the second can barrel pressure detector 390 biased by the coil spring 408 with the low elastic modulus can detect the pressing quantity with a high accuracy. This can also make up for the detection error coming from the first can barrel pressure detector 370. Accordingly, it is possible to detect the pressing quantity with a high accuracy over a wide range of can internal pressures. That is, it is possible to carry out the can internal pressure inspection with a high degree of accuracy even for cans having different internal pressures.

Figure 17:
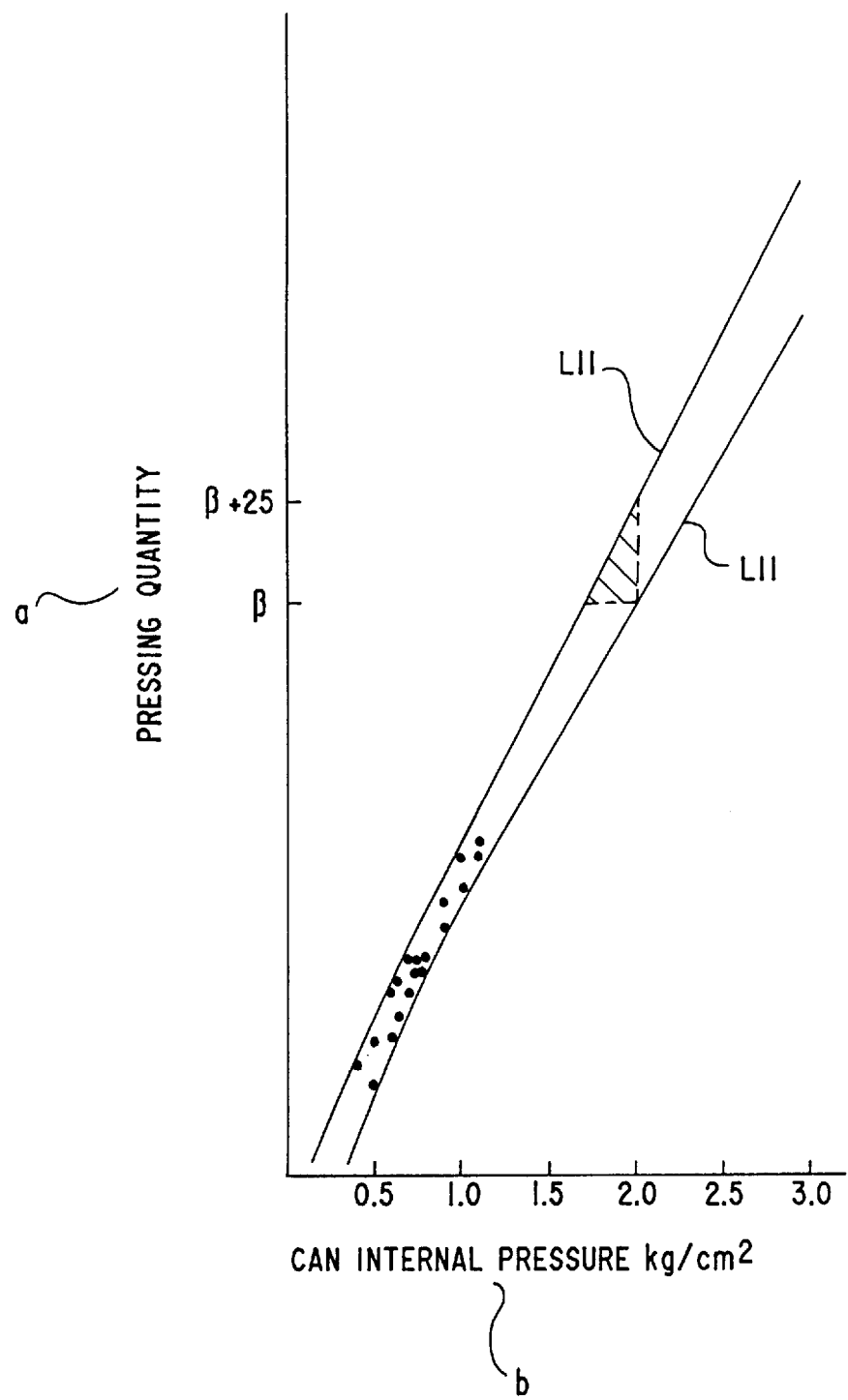
FIG. 17 is a graphic view showing the test result of the relationship between a can internal pressure and a pressing quantity taken when springs with different spring constants are employed for first and second biasing means of first and second can barrel pressure detectors.

FIG. 17 is a graph showing pressing quantity detection test results taken for a number of cans 1 whose internal pressures are known beforehand, when they are inspected through the use of the first and second can barrel pressure detectors 370, 390 according to this embodiment. As obvious from this graph, in cases where, like this embodiment, the elastic modulus of the coil spring 388 of the first biasing means 380 in FIG. 11 is set higher than that of the coil spring 408 of the second biasing means 400, the analytical curves L11, L11 expressing the corresponding relation between the pressing quantity and the can internal pressure over the range from the can 1 with a low internal pressure, to the can 1 with a high internal pressure, substantially assume sharply inclined straight lines. In addition, the separation between the analytical curves L11, L11 is narrow and scarcely varies from the can with the low internal pressure to the can with the high internal pressure.

Thus, for example, in cases where all cans whose internal pressures are 2.0 kg/cm$^2$ or more are treated as being defective, the reference pressing quantity is set to β. In this case, the cans 1 lying in the triangular area indicated by the shaded region in the illustration have an internal pressures less than 2.0 kg/cm$^2$, nevertheless the cans 1 included in the triangular area are determined to be defective. However, in this triangular area, the analytical curves L11, L11 (showing the corresponding relation between the pressing quantity and the can internal pressure) are sharply inclined straight lines, and the separation between the analytical curves L11, L11 does not greatly vary over the range from a low can internal pressure to a high can internal pressure. For these reasons, the number of cans erroneously determined to have an internal pressure greater than 2.0 kg/cm$^2$ is reducible. Accordingly, in this embodiment, it is possible to perform the internal pressure inspection with a high accuracy over a wide range of the can internal pressures.

In the above-described embodiment, it is also possible that the elastic modulus of the coil spring 388 of the first biasing means 380 (in the first can barrel pressure detectors 370 of FIG. 11) is decreased to be approximately equal to that of the coil spring 408 of the second biasing means 400

Figure 18:
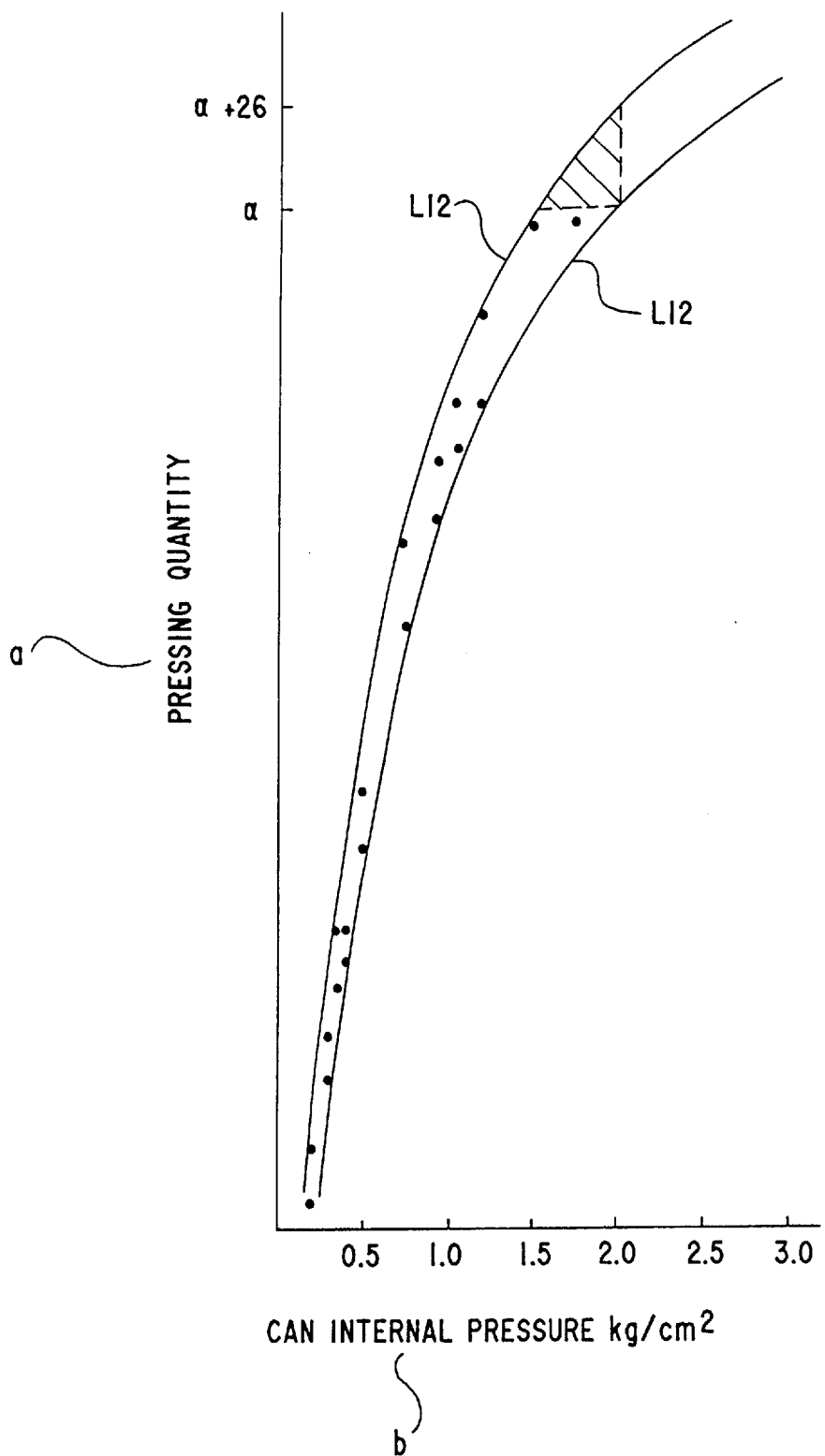
FIG. 18 is a graphic view showing the test result of the relationship between a can internal pressure and a pressing quantity taken when springs with the same spring constant are employed for the first and second biasing means of the first and second can barrel pressure detectors.

(in the second can barrel pressure detector 390). In this case, a number of cans 1 whose internal pressures are known in advance are inspected, and the test results of the pressing quantity are as shown in FIG. 18. As compared with the case of FIG. 17, as the can internal pressure becomes greater, the inclinations of the analytical curves L12, L12 vary and the separation therebetween is enlarged. Thus, this case will mainly be applicable to the inspection for cans 1 with a low internal pressure, such as juice cans and sports drink cans.

Figure 19:
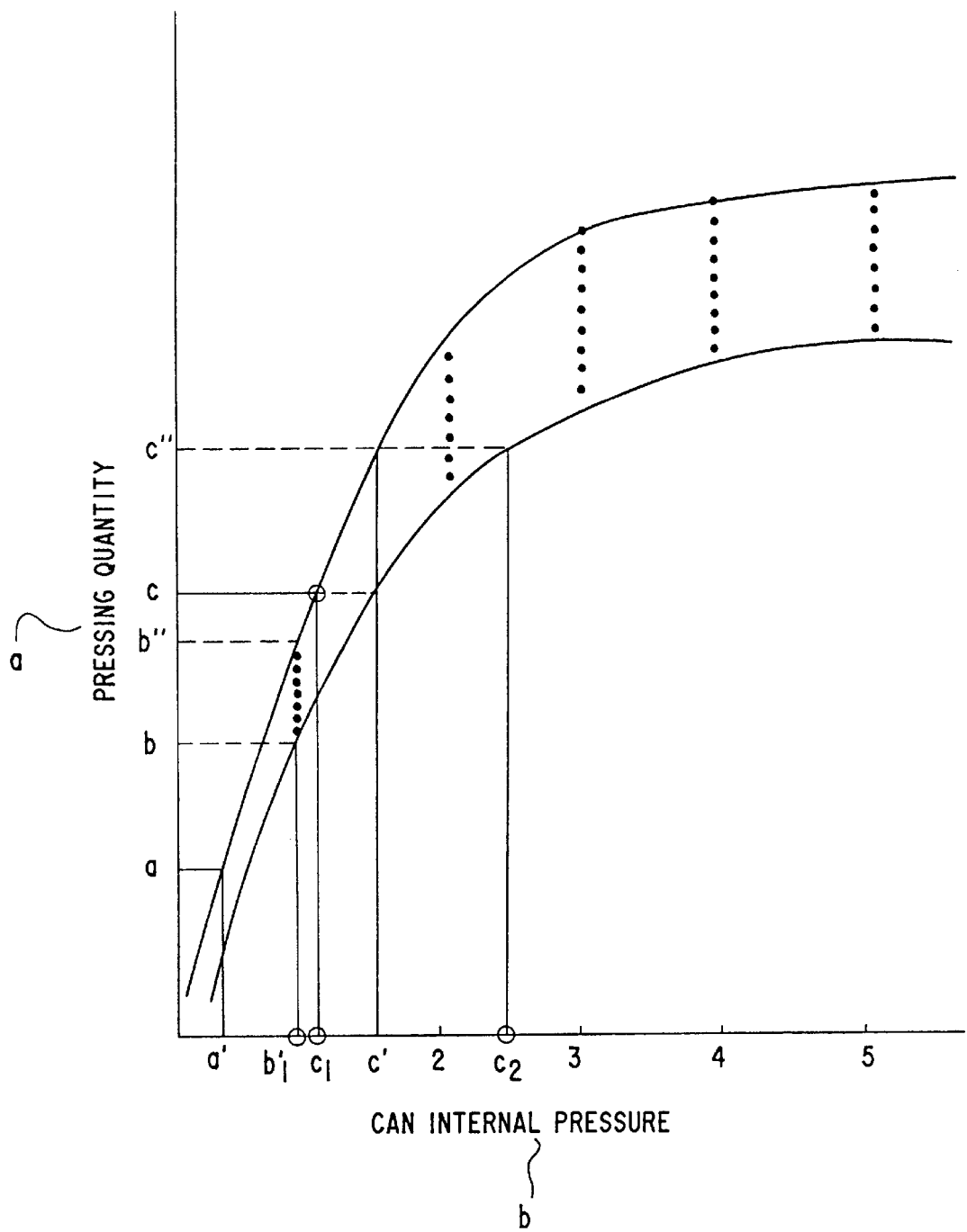
FIG. 19 is a graphic view showing the test result of the relationship between a can internal pressure and a pressing quantity due to only the second can barrel pressure detector taken when springs with the same spring constant are employed for the first and second biasing means of the first and second can barrel pressure detectors.

Furthermore, in the case of FIG. 18, it is possible to omit one of the first and second displacement sensors 379, 399 of the first and second can barrel pressure detections 370, 390 in FIG. 10. This will be applicable to the inspection for the cans including mineral water or the like which do not require a high accurate pressing quantity detection. FIG. 19 shows test results of the pressing quantity detection taken when an internal pressure inspection is made to a number of cans whose internal pressures are previously known. As obvious from this result, as compared with the case of FIG. 18, the inclinations of the analytical curves L13, L13 vary and the separation therebetween becomes wide as the can internal pressure becomes greater.

Figure 20:
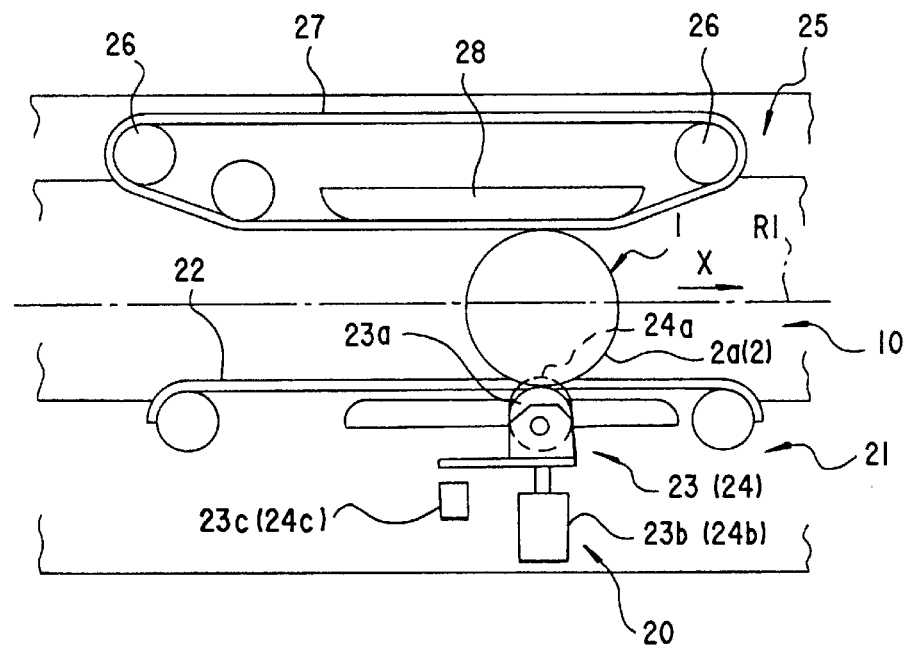
FIG. 20 is a plan view showing an example of a prior can internal pressure inspection apparatus.
Figure 21:
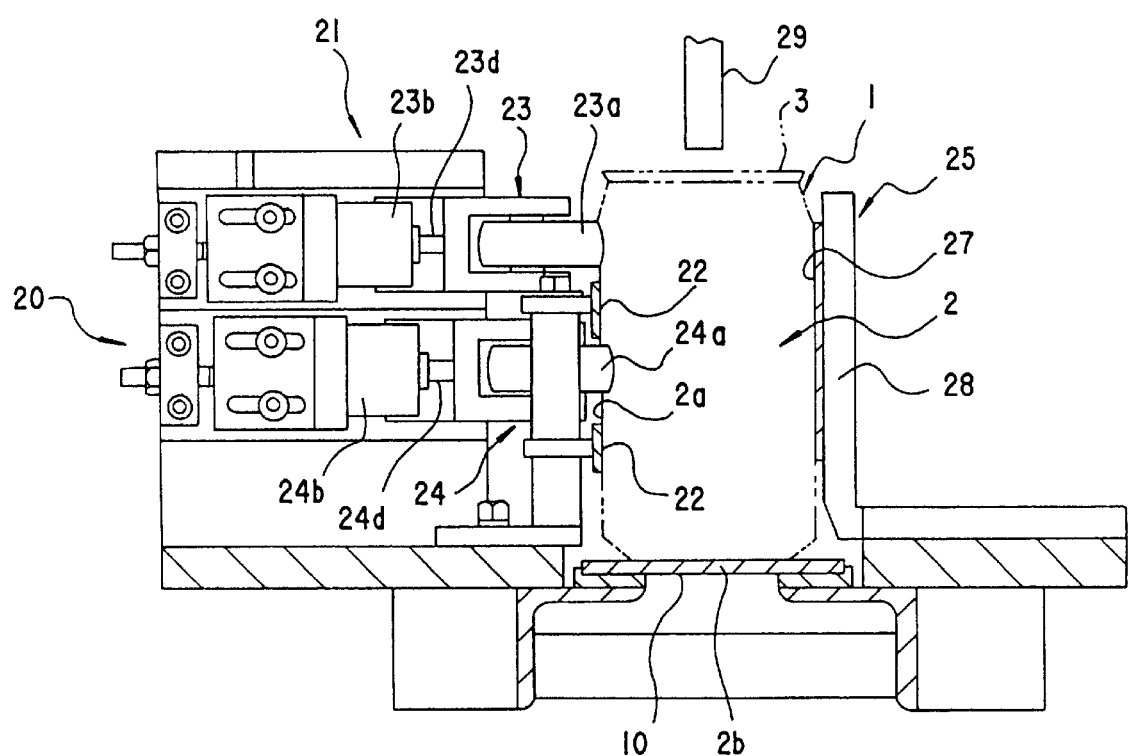
FIG. 21 is a front elevational view showing the FIG. 20 can internal pressure inspection apparatus.

Although in the above-described embodiment the can 1 is conveyed through the carrying conveyer 100 in a state that it takes an upright position, it is also possible that in the place of the can barrel guide section 350 the can barrel guide section 25 as shown in FIG. 20 is employed so that the can 1 is carried through the endless belt 27 of the can barrel guide section 25, thus omitting the belt conveyer 100. In addition, it is also appropriate that the carrying means such as the endless belt 27 is also provided in the can barrel pressure detection section 360 in FIG. 2. The present invention includes an arrangement where the guide plate 354 is omitted in the can barrel guide section 350 in this embodiment. Further, there is no need for the can to be always carried in a state that it takes an upright position. It is also acceptable that the can internal pressure inspection apparatus changes its position to allow that the can 1 is carried in a state that its axis CT takes a horizontal direction or an inclined position. Still further, in this invention, it is also possible that without using the separation change mechanism 330 in FIG. 3 can be barrel guide section 350 and can barrel pressure detection section 360 are fixed to the body frame 310.

Moreover, in this invention, the can pressure detection section contemplates any structure including any one of the first and second can barrel pressure detectors 370, 390 and the can cover pressure detector 414, that is, the invention can have only one of the first and second can barrel pressure detectors 370, 390 and the can cover pressure detector 414 or similar structure obtaining the advantages disclosed herein. Further, although in the above-described embodiment of the first and second pressure detectors 370. 390 are biased by the coil springs 288, 408, it is also appropriate that they are biased by air cylinders. Still further, it is also possible to employ a structure where the pressure applied to the presser is detected by a strain sensor, in place of the structure in which the displacement of the pressers such as the first and second detection heads 375, 395 is detected to detect the pressure on the barrel section 2a of the can 1.

In addition, since in the can carrying path R1 in FIG. 1 the photoelectric sensor is placed in the downstream side with respect to the air discharging device 510 of the defective can removal unit 500, it is also possible to additionally provide a can removal failure detection unit for detecting the failure in the removal of the defective can 1 on the basis of the can sense signal from this photoelectric sensor. In this instance, the photoelectric sensor and a display serving as an output unit are connected to the control unit 600. In addition to the above-mentioned arrangement, the control unit 600 can have an arrangement to calculate and detect the failure in the removal of the defective can 1 on the basis of the can sense signal from the photoelectric sensor and further to indicate an alarm on the display when detecting the removal failure.

In the can internal pressure inspection apparatus according to this invention, the defective can removal unit is started on the basis of the can sense signal from the can sensor which senses the can after the completion of the detection of the can internal pressure and the decision on the acceptance or failure in the can internal pressure by the control unit. Accordingly, the waiting time till the start-up of the defective can removal unit from the sensing of the can is reduced or eliminated. Thus, unlike the prior art, the defective can is accurately removable to eliminate or reduce the need to manually remove the non-removed can, which can simplify the internal pressure inspection.

In addition, even if the error such as the decrease in the can carrying speed occurs because of the pressing of the can barrel section by the can barrel pressure detector, since the can sensor senses the can after the completion of the detection of the can internal pressure by the can pressure detector, the error does not have influence on the starting time of the defective can removal unit. Accordingly, it is possible to accurately remove the defective can and to simplify the internal pressure inspection. Further, the separation change mechanism can change the separation between the can barrel pressure detection section and the can barrel guide section, and hence it is possible to simply perform the internal pressure inspection for cans of types different in width dimension.

Furthermore, since the separation between the can barrel pressure detection section and the can barrel guide section can be changed by the rotation of the width variable gauge, the change of the separation between the can barrel pressure detection section and the can barrel guide section (due to the change in the kind of the can to be inspected) becomes simplified. In addition, since the apparatus body can be shifted and adjusted in the axial direction of the can with respect to the can carrying path by means of the positioning device so that the pressing height position of the can barrel pressure detector relative to the barrel section of the can is changeable to an appropriate position, the internal pressure inspection for cans of types different in height dimension can be simplified.

Still further, since the apparatus body can be shifted and adjusted in the axial directions of the can with respect to the can carrying path by means of the positioning device so that the separation between the cover of the can and the can cover pressure detector can by changed to an appropriate distance, it is possible to easily perform the internal pressure inspection for cans of types different in height dimension. In addition, the presser of the can barrel pressure detector is biased by the elastic member, and therefore it is unnecessary to ensure the airtightness unlike the prior art where the biasing depends upon the air cylinder. For this reason, even if the rod is put to use, it is unnecessary that the rod is guided in a tight condition, with the result that the seize in the can barrel pressure detector does not occur, which can lengthen the life of the can barrel pressure detector and mitigate replacement work, thus simplifying the can internal pressure inspection.

Moreover, since the pressing quantity of the presser against the can barrel section is adjustable by the operation of the biasing adjustment mechanism, it is possible to prevent the detection accuracy of the can internal pressure from deteriorating even if the pressing quantity greatly decreases or increases for cans of types different in internal pressure. Accordingly, the detection of the can internal pressure can be done with a high accuracy for the cans of the kinds different in internal pressure.

Furthermore, a plurality of can barrel pressure detectors different in property can be used so that, for example, the can internal pressure results are averaged and the can internal pressure is inspected taking the average result into consideration, which can heighten the inspection accuracy. Still further, if the portion of the presser which repeatedly comes into contact with the barrel section of the can is worn out, the presser can be rotated and positioned so that the portion of the presser which is not worn off is brought into contact with the barrel section of the can. Thus, the can internal pressure inspection can continuously be done, and the accuracy of the inspection can improve and the life of the presser can lengthen. Accordingly, it is possible to further relax the replacement working and to further simplify the can internal pressure inspection.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. A can internal pressure inspection apparatus comprising:
    an apparatus body located in relation to a can carrying path, said apparatus body including a body frame, and a can barrel pressure detection section and a can barrel guide section which are disposed to be in opposed relation to each other with said can carrying path interposed therebetween, said can barrel pressure detection section section having a can barrel pressure detector for pressing against a barrel portion of a can; and
    a separation change mechanism for changing a separation distance between said can barrel pressure detection section and said can barrel guide section including
        a first movable frame for supporting said can barrel guide section; and
        a second movable frame for supporting said can barrel pressure detection section;
        a width variable gauge rotatable attached to said body frame and disposed between said first and second movable frames to be brought into contact therewith, said width variable gauge having a variable width in accordance with a rotation of the width variable gauge, said first and second movable frames being movably supported by said body frame so that said can barrel pressure detection section and said can barrel guide section can approach each other and separate from each other in accordance with the amount of said rotation applied to said width variable gauge.

2. A can internal pressure inspection apparatus as defined in claim 1, further comprising a positioning unit for moving and positioning said apparatus body in the axial direction of a can on said can carrying path.

3. A can internal pressure inspection apparatus as defined in claim 2, wherein said apparatus body includes a can cover pressure detector disposed to be in opposed relation to a cover of a can undergoing conveyance on said can carrying path to detect the internal pressure of said can by sensing a bulge of said can cover.

4. A can internal pressure inspection apparatus comprising an apparatus body located in relation to a can carrying path, said apparatus body including a can barrel pressure detection section and a can barrel guide section which are disposed to be in opposed relation to each other with said can carrying path interposed therebetween, said can barrel pressure detection section having a can barrel pressure detector for pressing against a barrel portion of a can, said can barrel pressure detector including:
    pressing means for pressing a barrel portion of a can;
    biasing means for biasing said pressing means toward said can barrel portion; and
    a displacement sensor for sensing a displacement of said pressing means,
    wherein said biasing means has an elastic member for biasing said pressing means and is provided with a bias adjusting mechanism for adjusting a biasing force of said elastic member by expanding and contracting said elastic member.

5. A can internal pressure inspection apparatus comprising an apparatus body located in relation to a can carrying path, said apparatus body including a can barrel pressure detection section and a can barrel guide section which are disposed to be in opposed relation to each other with said can carrying path interposed therebetween, said can barrel pressure detection section having a can barrel pressure detector for pressing against a barrel portion of a can, said can barrel pressure detector including:
    pressing means for pressing a barrel portion of a can;
    biasing means for biasing said pressing means toward said can barrel portion; and
    a displacement sensor for sensing a displacement of said pressing means,
    wherein said biasing means has an elastic member for biasing said pressing means, and
    said apparatus further includes a plurality of can barrel pressure detectors each having pressing means, biasing means including an elastic member and a displacement sensor, wherein a first elastic member of a first biasing means of at least one of said plurality of can barrel pressure detectors has an elastic modulus different from a second elastic member of a second biasing means of another can barrel pressure detector.

6. A can internal pressure inspection apparatus as defined in claim 4, wherein said pressing means is supported to be rotatable for free positioning against a circumferential surface of said can barrel, thereby allowing different portions of said pressing means to contact said can barrel so as to avoid any decrease in accuracy that results from wear upon said pressing means.

* * * * *